United States Patent
Miyahisa et al.

(10) Patent No.: US 11,346,231 B2
(45) Date of Patent: May 31, 2022

(54) TURBINE ROTOR BLADE AND GAS TURBINE

(71) Applicant: Mitsubishi Power, Ltd., Yokohama (JP)

(72) Inventors: Yasuo Miyahisa, Yokohama (JP); Satoshi Hada, Yokohama (JP); Susumu Wakazono, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 0 days.

(21) Appl. No.: 16/981,387

(22) PCT Filed: Mar. 19, 2019

(86) PCT No.: PCT/JP2019/011455
§ 371 (c)(1),
(2) Date: Sep. 16, 2020

(87) PCT Pub. No.: WO2019/188588
PCT Pub. Date: Oct. 3, 2019

(65) Prior Publication Data
US 2021/0071535 A1 Mar. 11, 2021

(30) Foreign Application Priority Data
Mar. 27, 2018 (JP) .............................. JP2018-060015

(51) Int. Cl.
*F01D 5/18* (2006.01)
*F02C 7/18* (2006.01)

(52) U.S. Cl.
CPC ............... *F01D 5/186* (2013.01); *F02C 7/18* (2013.01); *F05D 2220/32* (2013.01);
(Continued)

(58) Field of Classification Search
CPC ..... F01D 5/186; F01D 5/187; F05D 2250/185
See application file for complete search history.

(56) References Cited

U.S. PATENT DOCUMENTS 5,326,224 A * 7/1994 Lee .................. F01D 5/186 416/97 R
6,092,982 A * 7/2000 Ikeda ............... F01D 5/186 137/806
(Continued)

FOREIGN PATENT DOCUMENTS

JP 07-293202 11/1995
JP 10-54203 2/1998
(Continued)

OTHER PUBLICATIONS

Office Action dated Sep. 21, 2021, issued in counterpart JP application No. 2018-060015 with Machine Translation.
(Continued)

*Primary Examiner* — Eldon T Brockman
(74) *Attorney, Agent, or Firm* — Wenderoth, Lind & Ponack, L.L.P.

(57) ABSTRACT

A turbine rotor blade includes a blade body including a pressure-side blade wall and a suction-side blade wall. The blade body includes: a serpentine passage composed of a cooling passage separated into a plurality of parts by a partition wall that connects the pressure-side blade wall and the suction-side blade wall and extends along a height direction of the blade body; and a first cooling hole communicating at one end with the cooling passage via a first inlet opening formed in an inner wall surface of the pressure-side blade wall or the suction-side blade wall, and communicating at another end with a first outlet opening formed in an outer wall surface of the pressure-side blade wall or the suction-side blade wall of the blade body. The first cooling hole extends in a leading edge direction from the first inlet opening to the first outlet opening.

14 Claims, 8 Drawing Sheets

(52) U.S. Cl.
CPC .... *F05D 2240/30* (2013.01); *F05D 2250/185* (2013.01); *F05D 2260/202* (2013.01); *F05D 2260/232* (2013.01)

(56) References Cited

U.S. PATENT DOCUMENTS

| | | | |
|---|---|---|---|
| 6,491,496 B2* | 12/2002 | Starkweather | F01D 5/187 |
| | | | 416/97 R |
| 7,645,122 B1 | 1/2010 | Liang | |
| 10,605,170 B2* | 3/2020 | Bunker | F23R 3/005 |
| 2002/0182074 A1 | 12/2002 | Bunker | |
| 2006/0257257 A1 | 11/2006 | Deschamps et al. | |
| 2007/0048133 A1 | 3/2007 | Palmer et al. | |
| 2010/0239409 A1 | 9/2010 | Draper | |
| 2012/0282108 A1 | 11/2012 | Lee et al. | |
| 2014/0227103 A1* | 8/2014 | Lee | F01D 5/20 |
| | | | 416/97 R |
| 2016/0010463 A1* | 1/2016 | Quach | F01D 5/186 |
| | | | 60/806 |
| 2017/0159450 A1 | 6/2017 | Buhler et al. | |
| 2019/0040747 A1 | 2/2019 | Izumi et al. | |

FOREIGN PATENT DOCUMENTS

| | | |
|---|---|---|
| JP | 10-231703 | 9/1998 |
| JP | 2003-322002 | 11/2003 |
| JP | 2010-216472 | 9/2010 |
| JP | 4688758 | 5/2011 |
| JP | 2017-115862 | 6/2017 |
| WO | 2017/056997 | 4/2017 |

OTHER PUBLICATIONS

International Search Report dated Jun. 11, 2019 in International (PCT) Application No. PCT/JP2019/011455 with English-language translation.

English translation of International Preliminary Report on Patentability and Written Opinion of the International Searching Authority dated Oct. 8, 2020 in International Application No. PCT/JP2019/011455.

Office Action dated Dec. 14, 2021 in corresponding Japanese Patent Application No. 2018-060015, with Machine Translation, 18 pages.

* cited by examiner

TURBINE ROTOR BLADE AND GAS TURBINE

TECHNICAL FIELD

The present disclosure relates to a turbine rotor blade and a gas turbine.

BACKGROUND

For example, a turbine rotor blade used in a gas turbine or the like is used in a high temperature combustion gas, and therefore has a cooling passage for cooling inside. Cooling air is circulated through the cooling passage to suppress temperature rise of the blade metal (see Patent Document 1).

CITATION LIST

Patent Literature

Patent Document 1: JP2003-322002A

SUMMARY

Problems to be Solved

The gas turbine blade disclosed in Patent Document 1 includes a serpentine passage inside the blade body, and cooling air is circulated through the serpentine passage to cool the blade body. Further, film cooling holes provided in the blade wall cool the blade wall and a partition wall. However, it cannot be said that the film cooling holes described in Patent Document 1 make good use of the cooling capacity of the cooling air.

In view of the above, an object of at least one embodiment of the present invention is to efficiently use the cooling capacity of a cooling fluid.

Solution to the Problems (1) A turbine rotor blade according to at least one embodiment of the present invention comprises: a blade body including a pressure-side blade wall and a suction-side blade wall. The blade body includes: a serpentine passage composed of a cooling passage separated into a plurality of parts by a partition wall that connects the pressure-side blade wall and the suction-side blade wall and extends along a height direction of the blade body; and a first cooling hole communicating at a first end with the cooling passage via a first inlet opening formed in an inner wall surface of the pressure-side blade wall or an inner wall surface of the suction-side blade wall, and communicating at a second end with a first outlet opening formed in an outer wall surface of the pressure-side blade wall or an outer wall surface of the suction-side blade wall of the blade body. The first cooling hole extends in a leading edge direction from the first inlet opening to the first outlet opening. The cooling passage includes a trailing-edge-side cooling passage communicating with the first cooling hole, and a leading-edge-side cooling passage disposed adjacent to a leading edge side of the trailing-edge-side cooling passage. The cooling passage is configured such that cooling air flowing through the cooling passage flows into the trailing-edge-side cooling passage after flowing through the leading-edge-side cooling passage.

With the above configuration (1), the first cooling hole communicating with the cooling passage via the first inlet opening is formed in the inner wall surface of the flow passage (trailing-edge-side cooling passage) on the downstream side of the partition wall forming the cooling passage in the cooling fluid flow direction. The cooling fluid supplied to the first cooling hole is a cooling fluid after cooling the upstream cooling passage (leading edge-side cooling passage) disposed upstream of the cooling passage across the partition wall. The supplied cooling fluid cools the cooling passage (trailing-edge-side cooling passage) on the downstream side of the partition wall and then convectively cools the blade body in the vicinity of the partition wall in the course of flowing the first cooling hole. Thus, the cooling capacity of the cooling fluid is efficiently used by reuse of the cooling fluid.

(2) In some embodiments, in the above configuration (1), the first cooling hole includes at least one of: a pressure-side first cooling hole communicating at the first end with the cooling passage via a pressure-side first inlet opening formed in the inner wall surface of the pressure-side blade wall, and communicating at the second end with a pressure-side first outlet opening formed in the outer wall surface of the pressure-side blade wall of the blade body, the pressure-side first cooling hole extending in the leading edge direction from the pressure-side first inlet opening to the pressure-side first outlet opening; or a suction-side first cooling hole communicating at the first end with the cooling passage via a suction-side first inlet opening formed in the inner wall surface of the suction-side blade wall, and communicating at the second end with a suction-side first outlet opening formed in the outer wall surface of the suction-side blade wall of the blade body, the suction-side first cooling hole extending in the leading edge direction from the suction-side first inlet opening to the suction-side first outlet opening.

With the above configuration (2), since the first cooling hole includes at least one of the pressure-side first cooling hole or the suction-side first cooling hole, it is possible to cool at least one of the pressure side or the suction side of the blade body.

(3) In some embodiments, in the above configuration (1) or (2), the blade body includes a second cooling hole communicating at a third end with the leading-edge-side cooling passage via a second inlet opening formed in the inner wall surface of the pressure-side blade wall or the inner wall surface of the suction-side blade wall, and communicating at a fourth end with a second outlet opening formed in the outer wall surface of the blade body, the second cooling hole extending in a trailing edge direction from the second inlet opening to the second outlet opening.

With the above configuration (3), since the blade body includes, in addition to the first cooling hole, the second cooling hole, it is possible to enhance the cooling of a region of the partition wall forming the cooling passage of the blade body where it is difficult to cool. Thus, it is possible to more effectively cool the blade body.

(4) In some embodiments, in the above configuration (3), the second cooling hole includes at least one of: a pressure-side second cooling hole communicating at the third end with the leading-edge-side cooling passage via a pressure-side second inlet opening formed in the inner wall surface of the pressure-side blade wall, and communicating at the fourth end with a pressure-side second outlet opening formed in the outer wall surface of the pressure-side blade wall of the blade body, the pressure-side second cooling hole extending in the trailing edge direction from the pressure-side second inlet opening to the pressure-side second outlet opening; or a suction-side second cooling hole communicating at the third end with the leading-edge-side cooling passage via a suction-side second inlet opening formed in the inner wall surface of the suction-side blade wall, and communicating at the fourth end with a suction-side second outlet opening formed in the outer wall surface of the suction-side blade wall of the blade body, the suction-side second cooling hole extending in the trailing edge direction from the suction-side second inlet opening to the suction-side second outlet opening.

With the above configuration (4), since the second cooling hole includes at least one of the pressure-side second cooling hole or the suction-side second cooling hole, the partition wall forming the cooling passage of the blade body is convectively cooled from at least one of the pressure side or the suction side. Thus, it is possible to further efficiently cool the blade body.

(5) In some embodiments, in the above configuration (3) or (4), a length in a leading-edge-to-trailing-edge direction between a position of the first outlet opening and a position of the second outlet opening is less than a length in the leading-edge-to-trailing-edge direction between a position of the first inlet opening and a position of the second inlet opening.

With the above configuration (5), since the length in the leading-edge-to-trailing-edge direction between the position of the first outlet opening and the position of the second outlet opening is less than the length in the leading-edge-to-trailing-edge direction between the position of the first inlet opening and the position of the second inlet opening, the first cooling hole and the second cooling hole disposed opposite sides of the partition wall come closer to the partition wall as they come closer to the outer openings, so that it is possible to enhance the cooling of a region of the partition wall which is difficult to cool.

(6) In some embodiments, in any one of the above configurations (3) to (5), a length in a leading-edge-to-trailing-edge direction between a position of the first outlet opening and a position of the second outlet opening is less than a thickness of the partition wall.

With the above configuration (6), since the length in the leading-edge-to-trailing-edge direction between the position of the first outlet opening of the first cooling hole and the position of the second outlet opening of the second cooling hole is less than the thickness of the partition wall, the first outlet opening and the second outlet opening come much closer to each other. Accordingly, the first cooling hole and the second cooling hole come closer to each other in the leading-edge-to-trailing-edge direction. Thus, it is possible to enhance the cooling of a region of the partition wall which is difficult to cool.

(7) In some embodiments, in any one of the above configurations (3) to (6), each of the pressure-side blade wall and the suction-side blade wall includes a partition wall joint region joined to the partition wall, and at least one of the first cooling hole or the second cooling hole passes through a part of the partition wall joint region.

As described above, the partition wall joint region is not in direct contact with the cooling passage, and thus is difficult to cool. Accordingly, the cooling effect of the cooling fluid flowing through the cooling passage is less applicable in this region.

In this regard, with the above configuration (7), since at least one of the first cooling hole or the second cooling hole passes through a part of the partition wall joint region, it is possible to cool the partition wall joint region, which is difficult to cool, by the cooling fluid flowing through the at least one of the first cooling hole or the second cooling hole.

(8) In some embodiments, in the above configuration (7), at least one of the first outlet opening or the second outlet opening is formed in the outer wall surface of the blade body so that a center position of the at least one of the first outlet opening or the second outlet opening is disposed in the partition wall joint region.

With the above configuration (8), since at least one of the first outlet opening or the second outlet opening is formed in the outer wall surface of the blade body such that the center position thereof is disposed in the partition wall joint region, it is possible to effectively cool the partition wall joint region.

(9) In some embodiments, in any one of the above configurations (3) to (8), the blade body includes a top panel formed on a tip side, and at least one of the first outlet opening or the second outlet opening is formed in an outer wall surface of the top panel.

Generally, in the turbine rotor blade, when the combustion gas passes between the top panel and the casing facing the top panel, the flow velocity of the combustion gas increases because a space between the top panel and the casing is small, so that the heat transfer rate to the blade body increases. Thus, heat load on the top panel is higher than that on the other portions.

With the above configuration (9), since at least one of the first outlet opening or the second outlet opening is formed in the outer wall surface of the top panel, it is possible to cool the top panel, which is exposed to higher heat load than the other portions, by the cooling fluid flowing through the at least one of the first cooling hole or the second cooling hole.

(10) In some embodiments, in any one of the above configurations (3) to (8), the blade body includes a top panel formed on a tip side, a connection portion between the pressure-side blade wall and the top panel has an inclined surface inclined with respect to the pressure-side blade wall and the top panel at the outer wall surface of the blade body, and at least one of the first outlet opening or the second outlet opening is formed in the inclined surface.

As described above, generally, in the turbine rotor blade, when the combustion gas passes between the top panel and the casing facing the top panel, the flow velocity of the combustion gas increases because a space between the top panel and the casing is small, so that the heat transfer rate to the blade body increases. Thus, heat load on the top panel is higher than that on the other portions. Accordingly, the temperature of the connection portion between the pressure-side blade wall and the top panel tends to increase due to heat transfer from the top panel.

Further, the connection portion between the pressure-side blade wall and the top panel in the blade body may be provided with an inclined surface inclined with respect to both the pressure-side blade wall and the top panel on the outer side of the blade body for suppressing turbulence of the combustion gas flow in the vicinity of the connection portion or for chamfering the connection portion.

In this regard, with the above configuration (10), since at least one of the first outlet opening or the second outlet opening is formed in the inclined surface, it is possible to effectively cool the connection portion between the pressure-side blade wall and the top panel where the temperature tends to increase, while cooling the top panel, which is exposed to higher heat load than the other portions, by the cooling fluid flowing through the at least one of the first cooling hole or the second cooling hole.

(11) In some embodiments, in the above configuration (9) or (10), the first inlet opening and the second inlet opening are formed at positions facing the serpentine passage and away from the top panel to a base side of the blade body.

At the connection portion between the top panel and the blade wall, stress concentration is likely to occur since the top panel and the blade wall having different extending directions are connected to each other. With the above configuration (11), since the first inlet opening and the second inlet opening are formed at positions facing the serpentine passage and away from the top panel to the base side of the blade body, it is possible to avoid that the first inlet opening and the second inlet opening are formed in a place where stress concentration is likely to occur.

(12) In some embodiments, in any one of the above configurations (2) to (11), the first inlet opening is formed so as to face the cooling passage extending along the height direction of the blade body and closest to a trailing edge in the serpentine passage.

With the above configuration (12), since the first inlet opening is formed so as to face the cooling passage closest to the trailing edge in the serpentine passage, the cooling fluid discharged from the first cooling hole to the outside of the blade body flows a longer distance along the serpentine passage than when the first inlet opening is formed in the other upstream cooling passages, so that more heat can be drawn away. Thus, with the above configuration (12) since more heat can be drawn away by the cooling fluid discharged from the first cooling hole to the outside of the blade body, it is possible to reduce the flow rate of the cooling fluid and suppress a reduction in turbine efficiency.

(13) In some embodiments, in any one of the above configurations (1) to (12), the pressure-side first inlet opening is formed closer to a base of the blade body than the suction-side first inlet opening is to the base.

As described above, at the connection portion between the top panel and the blade wall, stress concentration is likely to occur since the top panel and the blade wall having different extending directions are connected to each other. Further, generally, in the turbine rotor blade, temperature tends to be higher on the pressure side than on the suction side.

In this regard, with the above configuration (13), since the pressure-side first inlet opening is formed closer to the base than the suction-side first inlet opening is to the base, on the pressure side where temperature tends to be higher than on the suction side, the pressure-side first inlet opening can be positioned further away from the connection portion between the top panel and the pressure-side blade wall where stress concentration is likely to occur.

(14) In some embodiments, in any one of the above configurations (1) to (13), a center line of the partition wall extending from one of the pressure-side blade wall or the suction-side blade wall to the other is inclined with respect to a camber line.

In the above configuration (14), since the center line of the partition wall extending from one of the pressure-side blade wall or the suction-side blade wall to the other is inclined with respect to the camber line, the cross-sectional shape of the partition wall deforms such that the widths of the pressure-side partition wall joint region and the suction-side partition wall joint region in the leading-edge-to-trailing-edge direction increase, and the region which is difficult to cool is enlarged. In this regard, in the above configuration (14), by combination of the first cooling hole and the second cooling hole, it is possible to suppress temperature rise of at least one of the pressure-side partition wall joint region or the suction-side partition wall joint region.

(15) A gas turbine according to at least one embodiment of the present invention comprises: the turbine rotor blade having any one of the above configurations (1) to (14). Thus, it is possible to efficiently use the cooling capacity of the cooling fluid, and effectively cool the blade body. Thus, it is possible to reduce the flow rate of the cooling fluid and suppress a reduction in turbine efficiency.

Advantageous Effects

According to at least one embodiment of the present invention, it is possible to efficiently use the cooling capacity of a cooling fluid.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
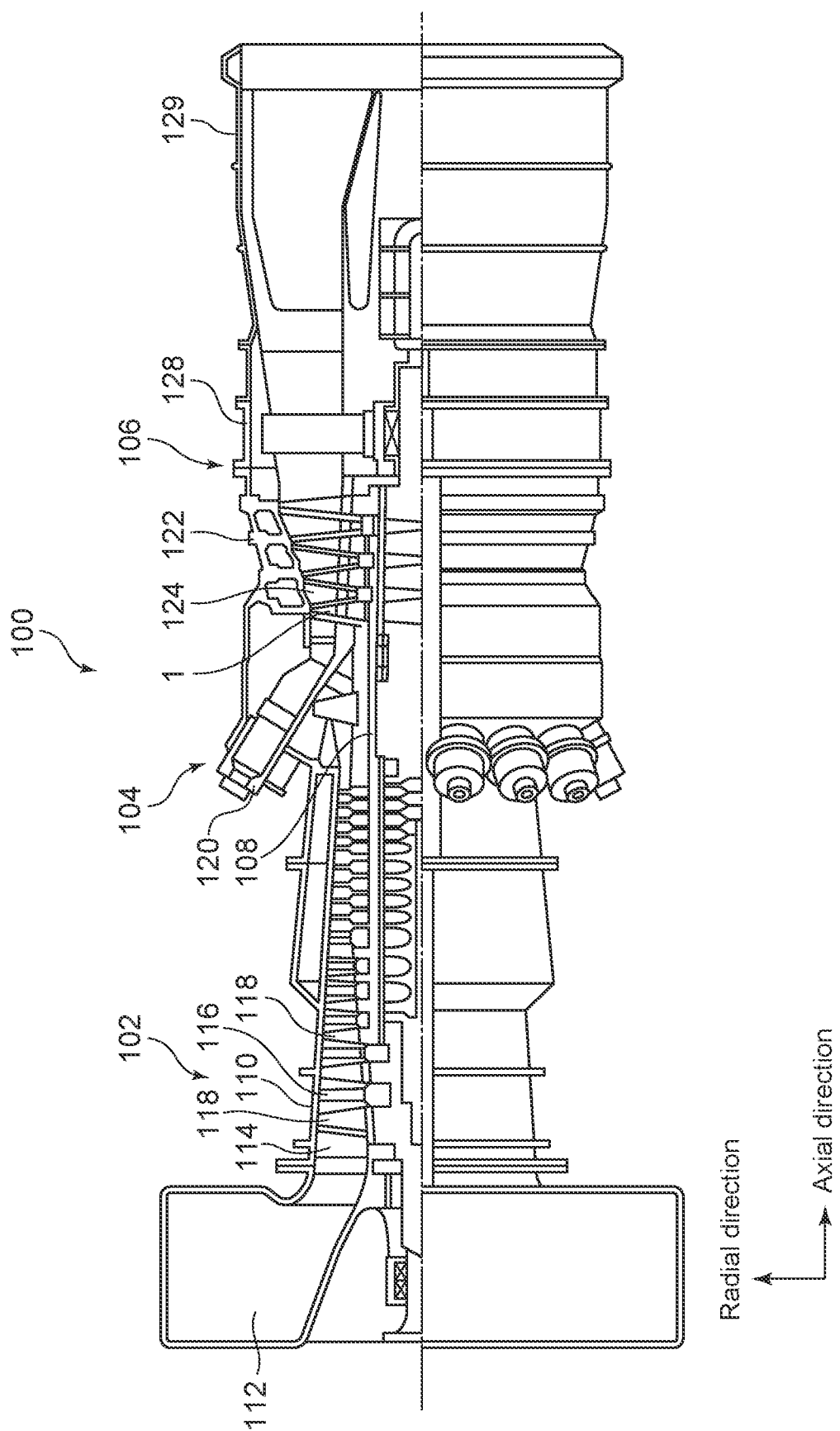
FIG. 1 is a schematic configuration diagram of a gas turbine according to an embodiment using a turbine rotor blade according to some embodiments.

A gas turbine using a gas turbine rotor blade according to some embodiments will be described with reference to FIG. 1. FIG. 1 is a schematic configuration diagram of a gas turbine 100 according to an embodiment using a turbine rotor blade according to some embodiments.

As shown in FIG. 1, the gas turbine 100 according to an embodiment includes a compressor 102 for producing compressed air, a combustor 104 for producing combustion gas using the compressed air and fuel, and a turbine 106 configured to be driven by the combustion gas to rotate. In the case of the gas turbine 100 for power generation, a generator (not illustrated) is connected to the turbine 106, so that rotational energy of the turbine 106 generates electric power.

The configuration example of each component in the gas turbine 100 will be described specifically.

The compressor 102 includes a compressor casing 110, an air inlet 112, disposed on the inlet side of the compressor casing 110, for sucking in air, a rotor shaft 108 disposed so as to penetrate through both of the compressor casing 110 and a turbine casing 122 described below, and a variety of blades disposed in the compressor casing 110. The variety of blades includes an inlet guide vane 114 disposed adjacent to the air inlet 112, a plurality of compressor stator vanes 116 fixed to the compressor casing 110, and a plurality of compressor rotor blades 118 implanted on the rotor shaft 108 so as to be arranged alternately with the compressor stator vanes 116 in the axial direction. The compressor 102 may include other constituent elements not illustrated in the drawings, such as an extraction chamber. In the compressor 102, the air sucked in from the air inlet 112 flows through the plurality of compressor stator vanes 116 and the plurality of compressor rotor blades 118 to be compressed into compressed air. The compressed air is sent to the combustor 104 of a latter stage from the compressor 102.

The combustor 104 is disposed in a casing (combustor casing) 120. As illustrated in FIG. 1, a plurality of combustors 104 may be disposed in annular shape centered at the rotor shaft 108 inside the casing 120. The combustor 104 is supplied with fuel and the compressed air produced in the compressor 102, and combusts the fuel to produce combustion gas having high temperature and high pressure that serves as a working fluid of the turbine 106. The combustion gas is sent to the turbine 106 at a latter stage from the combustor 104.

The turbine 106 includes a turbine casing (casing) 122 and a variety of turbine blades disposed inside the turbine casing 122. The variety of turbine blades includes a plurality of turbine stator vanes 124 fixed to the turbine casing 122 and a plurality of turbine rotor blades 1 implanted on the rotor shaft 108 so as to be arranged alternately with the turbine stator vanes 124 in the axial direction.

In the turbine 106, the rotor shaft 108 extends in the axial direction, and the combustion gas flows from left to right in FIG. 1. In FIG. 1, the left side is the axially upstream side, and the right side is the axially downstream side.

The turbine rotor blade 1 and the turbine stator vanes 124 are configured to generate rotational driving force from the combustion gas having high temperature and high pressure flowing inside the turbine casing 122. When the rotational driving force is transmitted to the rotor shaft 108, the generator connected to the rotor shaft 108 is driven. A specific configuration example of the turbine rotor blade 1 will be described later.

An exhaust chamber 129 is connected to the downstream side of the turbine casing 122 via an exhaust casing 128. The combustion gas having driven the turbine 106 passes through the exhaust casing 128 and the exhaust chamber 129 and then is discharged outside.

Figure 2:
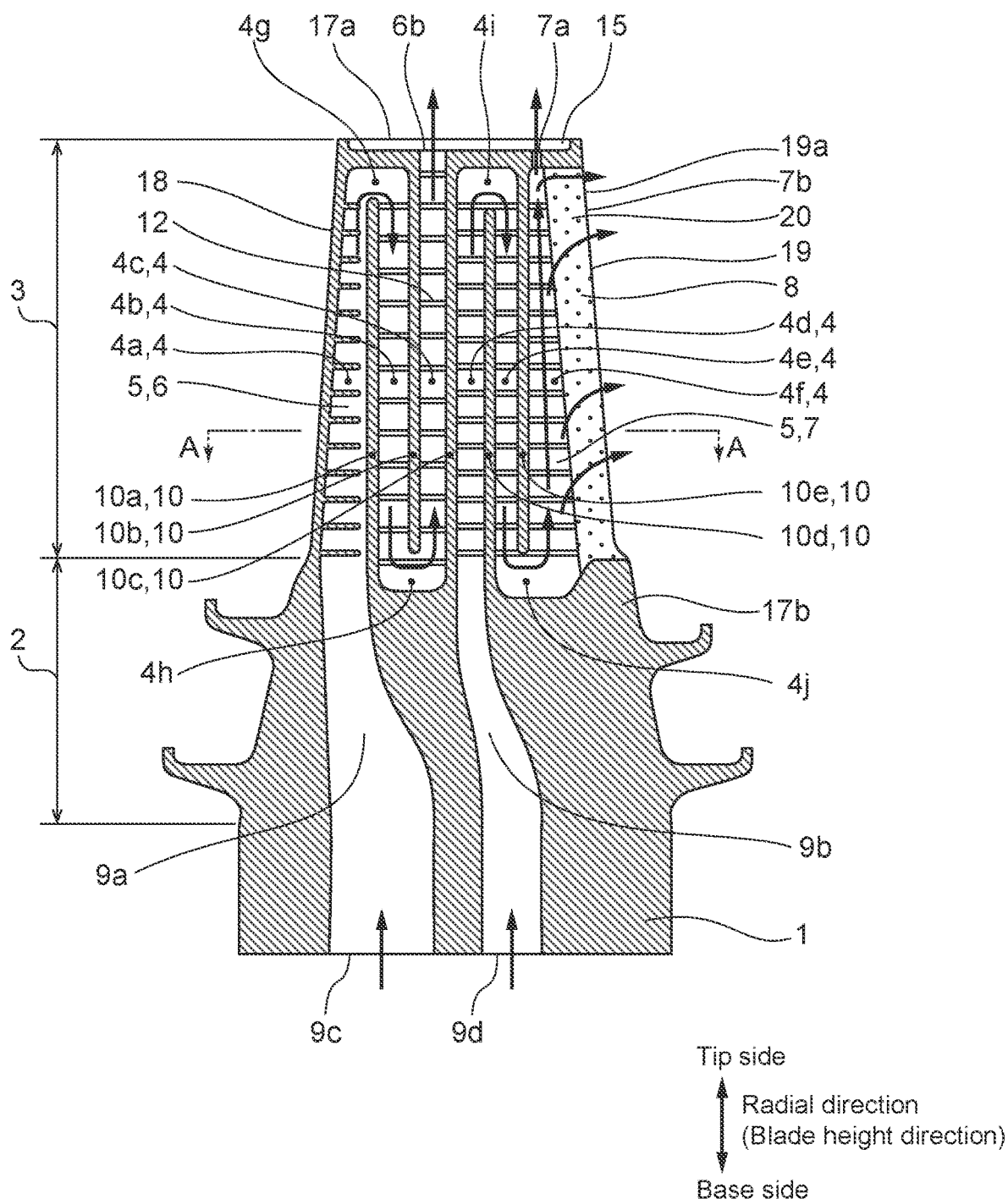
FIG. 2 is an internal cross-sectional view of a turbine rotor blade according to an embodiment.
Figure 3:
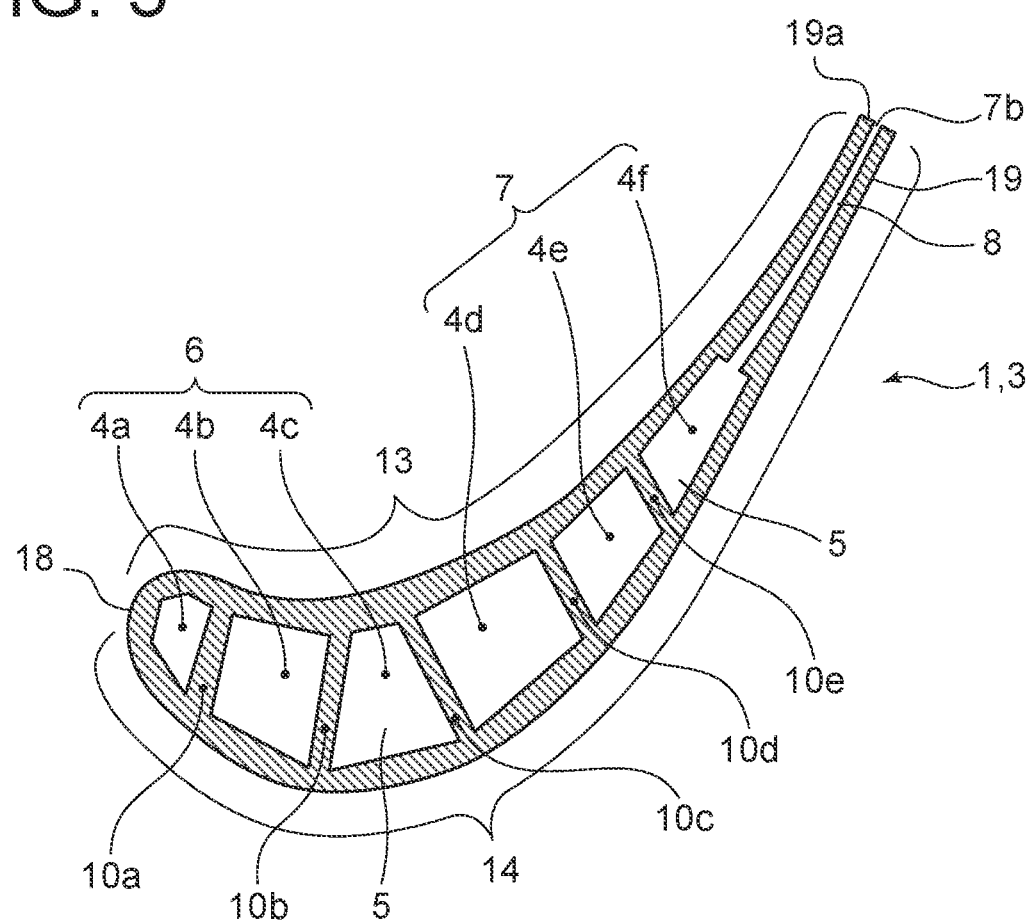
FIG. 3 is a cross-sectional view of a turbine rotor blade according to an embodiment taken along line A-A in FIG. 2.
Figure 4A:
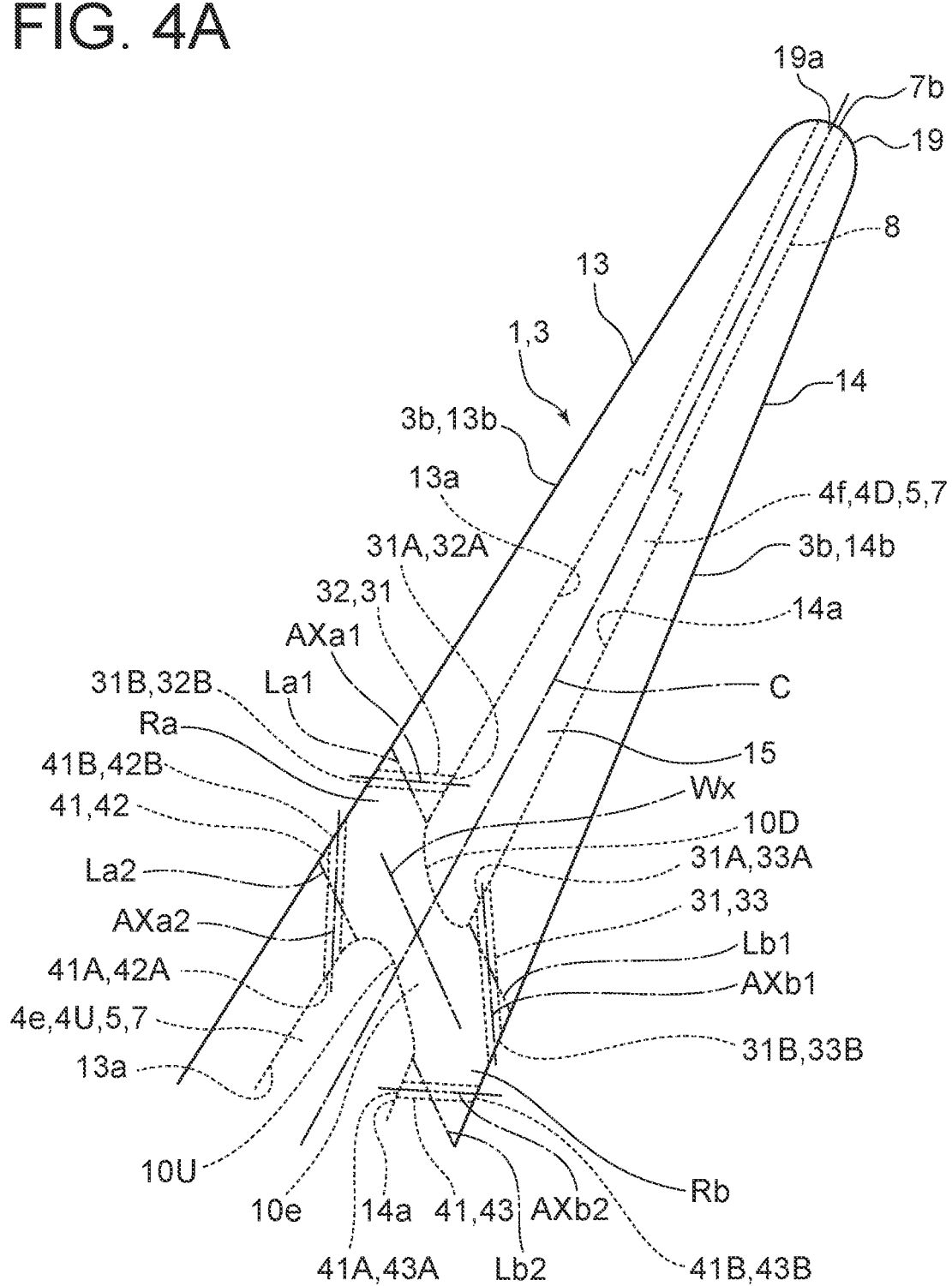
FIG. 4A is a view of the vicinity of a trailing edge of a turbine rotor blade according to an embodiment, viewed in a direction from the tip side to the radially inner side of the turbine rotor blade 1.
Figure 4B:
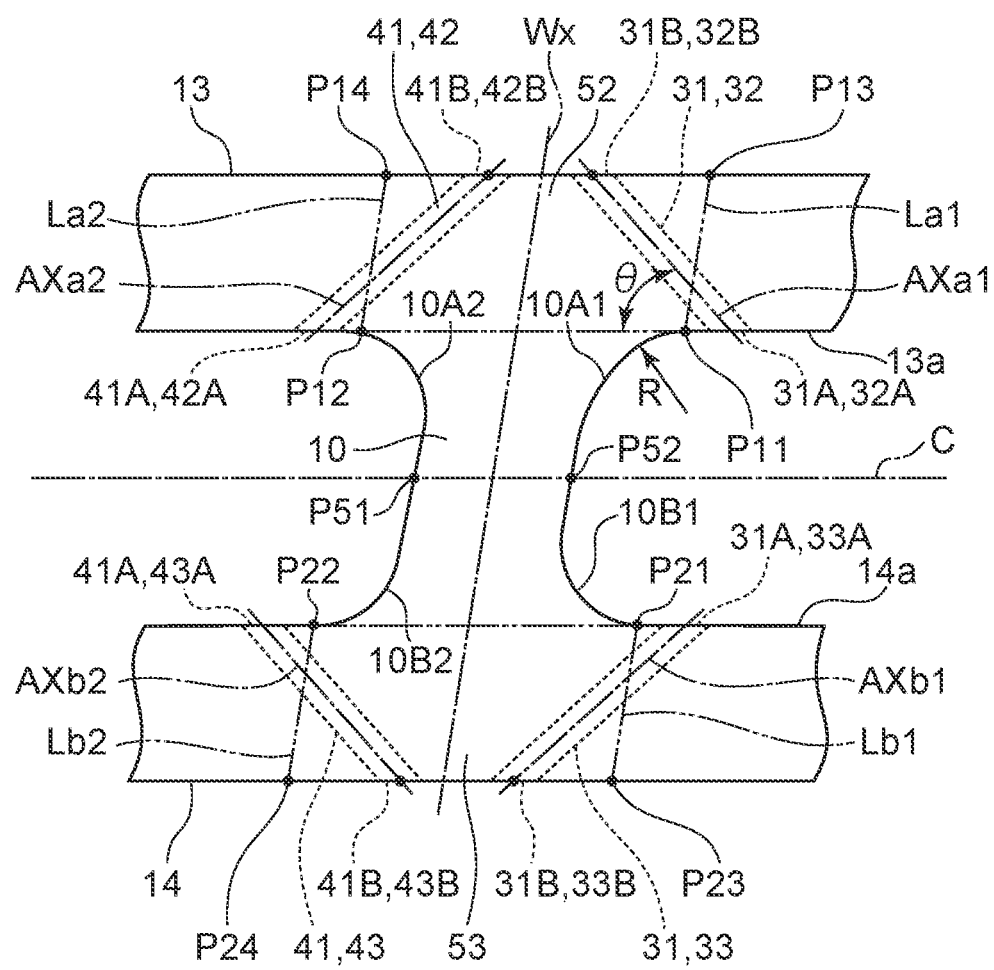
FIG. 4B is an enlarged cross-sectional view around the partition wall of FIG. 4A.

FIG. 2 is an internal cross-sectional view of the turbine rotor blade 1 according to an embodiment. FIG. 3 is a cross-sectional view of the turbine rotor blade 1 according to an embodiment taken along line A-A in FIG. 2. FIG. 4A is a view of the vicinity of a trailing edge of the turbine rotor blade 1 according to an embodiment, viewed in a direction from the tip 17a side to the radially inner side of the turbine rotor blade 1. FIG. 4B is an enlarged cross-sectional view around the partition wall 10 of FIG. 4A. The turbine rotor blade 1 according to an embodiment is a turbine rotor blade used in the turbine 106, and includes a platform, a shank portion 2 on the base 17b side, and an airfoil portion (blade body) 3. The blade body 3 is exposed to the combustion gas having high temperature and high pressure.

The blade body 3 includes a pressure-side wall portion (pressure-side blade wall) 13 which is a concave pressure surface of the blade, a suction-side wall portion (suction-side blade wall) 14 which is a convex suction surface of the blade, and a top panel 15 on the tip 17a side. The blade body 3 has a leading-edge-side serpentine passage 6 and a trailing-edge-side serpentine passage 7 for circulating the cooling air as cooling fluid (coolant) between an inner wall surface 13a of the pressure-side blade wall 13 and an inner wall surface 14a of the suction-side blade wall 14 which face each other, and these passages form a serpentine passage 5 as a whole.

Specifically, inside the blade body 3, partition walls 10a, 10b, 10c, 10d, 10e connecting the pressure-side blade wall 13 and the suction-side blade wall 14 are disposed so as to form cooling passages 4a, 4b, 4c, 4d, 4e, 4f surrounded by the partition walls 10a, 10b, 10c, 10d, 10e, the pressure-side blade wall 13, and the suction-side blade wall 14. Each cooling passage 4a, 4b, 4c, 4d, 4e, 4f is a flow passage orthogonal to the radial direction of the turbine rotor blade 1, i.e., the rotor shaft 108, and extends along the radial direction.

That is, the blade body 3 has the serpentine passage 5 (leading-edge-side serpentine passage 6, trailing-edge-side serpentine passage 7) composed of the cooling passages 4a, 4b, 4c, 4d, 4e, 4f separated by the partition walls 10a, 10b, 10c, 10d, 10e that connect the pressure-side blade wall 13 and the suction-side blade wall 14 and extend along the height direction of the blade body 3.

In the following description, unless it is necessary to distinguish the partition walls 10a, 10b, 10c, 10d, 10e, the alphabet at the end of the reference numeral is omitted, and they are simply referred to as the partition wall 10. Similarly, in the following description, unless it is necessary to distinguish the cooling passages 4a, 4b, 4c, 4d, 4e, 4f, the alphabet at the end of the reference numeral is omitted, and they are simply referred to as the cooling passage 4.

The leading-edge-side serpentine passage 6 is a cooling passage disposed on the leading edge 18 side with respect to the trailing-edge-side serpentine passage 7, and includes the cooling passages 4a, 4b, 4c. The cooling passage 4a and the cooling passage 4b are connected by a turning portion 4g, and the cooling passage 4b and the cooling passage 4c are connected by a turning portion 4h.

An inlet 9c of a supply passage 9a for the cooling air of the leading-edge-side serpentine passage 6 is disposed on the base 17b side of the turbine rotor blade 1, and an outlet 6b for the cooling air is disposed at the end on the tip 17a side of the blade body 3.

The trailing-edge-side serpentine passage 7 is a cooling passage disposed on the trailing edge 19 side with respect to the leading-edge-side serpentine passage 6, and includes the cooling passages 4d, 4e, 4f The cooling passage 4d and the cooling passage 4e are connected by a turning portion 4i, and the cooling passage 4e and the cooling passage 4f are connected by a turning portion 4j.

An inlet 9d of a supply passage 9b for the cooling air of the trailing-edge-side serpentine passage 7 is disposed on the base 17b side of the turbine rotor blade 1, and an outlet 7b for the cooling air communicates with the cooling passage 4f, which is most downstream in the trailing-edge-side serpentine passage 7 with respect to the cooling air flow, and opens to a trailing edge end surface 19a of the trailing edge 19 of the blade body 3.

The serpentine passage 5 (leading-edge-side serpentine passage 6, trailing-edge-side serpentine passage 7) has a plurality of weir-like ribs 12 for promoting heat transfer to the cooling air. Further, in the cooling passage 4f most downstream in the trailing-edge-side serpentine passage 7, a trailing edge cooling passage 8 opening to the trailing edge end surface 19a of the trailing edge 19 is formed for convective cooling of a trailing edge region. The trailing edge cooling passage 8 has a plurality of pin fins 20 for promoting heat transfer to the cooling air. The trailing edge cooling passage 8 may have a cooling structure with a plurality of cooling holes, instead of the pin fins 20.

The cooling air supplied to the turbine rotor blade 1 may be, for example, compressed air bled from the compressor 102.

In the leading-edge-side serpentine passage 6, the cooling air introduced from the inlet 9c flows through the supply passage 9a and the cooling passages 4a, 4b, 4c sequentially so as to meander between the tip 17a and the base 17b of the blade body 3, and is discharged from the outlet 6b to the outside of the turbine rotor blade 1. Thus, in the leading-edge-side serpentine passage 6, the cooling air flows through the cooling passages 4a, 4b, 4c sequentially so as to flow from the leading edge 18 to the trailing edge 19 in the blade body 3, i.e., from upstream to downstream in the combustion gas flow direction.

In the trailing-edge-side serpentine passage 7, the cooling air introduced from the inlet 9d flows through the supply passage 9b and the cooling passages 4d, 4e, 4f sequentially so as to form a meandering flow passage between the tip 17a and the base 17b of the blade body 3, and is discharged from the outlet 7b to the outside of the turbine rotor blade 1. Thus, in the trailing-edge-side serpentine passage 7, the cooling air flows through the cooling passages 4d 4e, 4f sequentially so as to flow from the leading edge 18 to the trailing edge 19 in the blade body 3, i.e., from upstream to downstream in the combustion gas flow direction. The cooling passage 4f closest to the trailing edge 19 forms a last flow passage of the trailing-edge-side serpentine passage 7, and a part of the cooling air flowing through the last flow passage is discharged into the outside combustion gas from the outlet 7a formed in the top panel 15 on the tip 17a side. The other cooling air convectively cools the trailing edge region through the trailing edge cooling passage 8, and is discharged into the combustion gas from the trailing edge end surface 19a.

The cooling passage 4c and the cooling passage 4d may be connected by a turning portion so that the leading-edge-side serpentine passage 6 and the trailing-edge-side serpentine passage 7 are integrally formed. In this case, the cooling air introduced from the supply passage 9a of the cooling air flows through the cooling passages 4a, 4b, 4c, 4d, 4e, 4f sequentially so as to form a meandering flow passage between the tip 17a and the base 17b of the blade body 3, and is discharged from the outlet 7b to the outside of the turbine rotor blade 1.

In the blade structure shown in FIG. 2, the cooling air is circulated through the serpentine passage 5 to convectively cool the blade body, and further, film cooling holes (not shown) provided in the blade wall (pressure-side blade wall 13, suction-side blade wall 14) film cool the blade wall.

Figure 7:
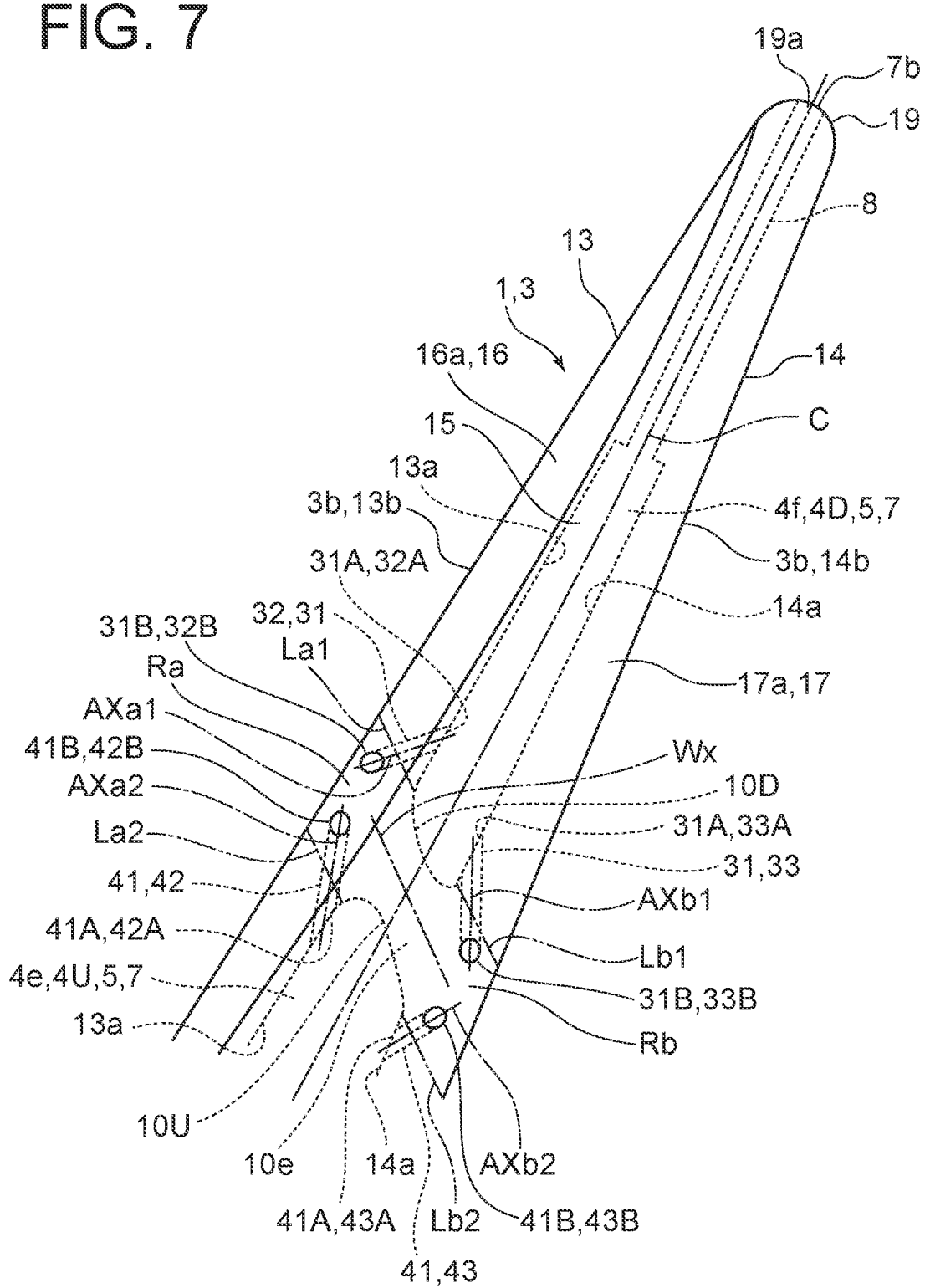
FIG. 7 is a view of the vicinity of a trailing edge of a turbine rotor blade according to another embodiment, viewed from the tip side of the turbine rotor blade (cross-sectional view taken along line B-B in FIG. 8).

As shown in FIGS. 4A and 7, in some embodiments, the blade body 3 includes a pressure-side first cooling hole 32 which communicates at one end (first end) with the cooling passage 4 via a pressure-side first inlet opening 32A (first inlet opening 31A) formed in the inner wall surface 13a of the pressure-side blade wall 13, and communicates at the other end (second end) with a pressure-side first outlet opening 32B (first outlet opening 31B) formed in the outer wall surface 13b of the pressure-side blade wall 13 of the blade body 3. The pressure-side first cooling hole 32 extends in the direction of the leading edge 18 from the first inlet opening 31A (pressure-side first inlet opening 32A) to the first outlet opening 31B (pressure-side first outlet opening 32B). In other words, the pressure-side first cooling hole 32 is formed such that the first outlet opening 31B (pressure-side first outlet opening 32B) is positioned closer to the leading edge 18 than the first inlet opening 31A (suction-side first inlet opening 32A) is to the leading edge 18 along the camber line C of the blade body 3. Further, as shown in FIGS. 4A and 7, in some embodiments, the blade body 3 includes a suction-side first cooling hole 33 which communicates at one end (first end) with the cooling passage 4 via a suction-side first inlet opening 33A formed in the inner wall surface 14a of the suction-side blade wall 14, and communicates at the other end (second end) with a suction-side first outlet opening 33B formed in the outer wall surface 14b of the blade body 3. The suction-side first cooling hole 33 extends in the direction of the leading edge 18 from the suction-side first inlet opening 33A to the suction-side first outlet opening 33B. In other words, the suction-side first cooling hole 33 is formed such that the suction-side first outlet opening 33B is positioned closer to the leading edge 18 than the suction-side first inlet opening 33A is to the leading edge 18 along the camber line C of the blade body 3.

When the cooling fluid flows through the serpentine passage 5, the cooling fluid convectively cools the blade body 3, and the temperature of the cooling fluid rises. On the other hand, when the cooling fluid flows through the serpentine passage 5, the pressure of the cooling fluid decreases due to pressure loss of the cooling fluid. The cooling fluid flowing on the downstream side in the cooling fluid flow direction is used efficiently by reuse of the cooling fluid compared with the cooling fluid flowing on the upstream side.

For instance, in FIGS. 2 and 3, when comparing adjacent cooling passages 4e, 4f, the cooling fluid flowing in the cooling passage 4e (later-described upstream cooling passage 4U) on the upstream side of the partition wall 10e to convectively cool the blade body 3 is introduced through the turning portion 4j into the cooling passage 4f (later described downstream cooling passage 4D) which is adjacent to the downstream side of the partition wall 10e in the cooling fluid flow direction. In the course of flowing the cooling passage 4e, the cooling fluid decreases the pressure due to pressure loss, and is supplied to the cooling passage 4f. Further, the cooling fluid cools the blade wall of the cooling passage 4f in the course of flowing through the cooling passage 4f.

That is, the cooling fluid flowing in the cooling passage 4e on the upstream side of the partition wall 10e in the cooling fluid flow direction has a low temperature, a high pressure, and a sufficient cooling capacity, but it is discharged into the combustion gas from a second cooling hole 41, 42, 43 described later, so that the cooling fluid having the cooling capacity is wasted. On the other hand, the cooling fluid supplied to the cooling passage 4f on the downstream side of the partition wall 10e after cooling the cooling passage 4e on the upstream side of the partition wall 10e in the cooling fluid flow direction further cools the cooling passage 4f and is then discharged into the combustion gas from the first cooling hole 31, 32, 33. Thus, the cooling fluid flowing in the cooling passage 4f on the downstream side of the partition wall 10e cools the downstream cooling passage 4f and then flows into the first cooling hole 31, 32, 33, compared with the cooling fluid that is discharged into the combustion gas through the second cooling hole 41, 42, 43 from the cooling passage 4e on the upstream side of the partition wall 10e. When the cooling fluid flows through the first cooling hole 31, 32, 33, the cooling fluid convectively cools the blade body 3, i.e., the cooling fluid is reused for efficiently cooling. In particular, when the cooling passage 4f is the last flow passage closest to the trailing edge 19, the effect is largest compared with the other upstream flow passages.

Thus, the cooling air introduced from the pressure-side first inlet opening 32A facing the cooling passage 4 flows in the leading edge 18 direction toward the pressure-side first outlet opening 32B inside the pressure-side first cooling hole 32 and convectively cools the pressure side of the blade body 3 in the vicinity of the partition wall 10.

Similarly, the cooling air introduced from the suction-side first inlet opening 33A facing the cooling passage 4 flows in the leading edge 18 direction toward the suction-side first outlet opening 33B inside the suction-side first cooling hole 33 and convectively cools the suction side of the blade body 3 in the vicinity of the partition wall 10.

Further, since the first cooling hole 31, 32, 33 communicates with the cooling passage on the downstream side of the partition wall 10 in the cooling fluid flow direction, the cooling fluid is efficiently reused. Thus, it is possible to efficiently use the cooling capacity of the cooling air, and effectively cool the blade body 3.

Further, since the gas turbine 100 according to some embodiments includes the turbine rotor blade 1 according to some embodiments, it is possible to efficiently use the cooling capacity of the cooling air, and effectively cool the blade body 3. Thus, it is possible to reduce the flow rate of the cooling air and suppress a reduction in turbine efficiency.

The blade body 3 may have at least one of the pressure-side first cooling hole 32 or the suction-side first cooling hole 33. When the blade body 3 has both the pressure-side first cooling hole 32 and the suction-side first cooling hole 33, it is possible to efficiently cool the blade body 3 from both pressure and suction sides.

Among the cooling passages 4 of the serpentine passage 5 (leading-edge-side serpentine passage 6, the trailing-edge-side serpentine passage 7), the cooling passage 4 located on the upstream side of a certain partition wall 10 in the cooling air flow direction is referred to as an upstream cooling passage 4U, and the cooling passage 4 located on the downstream side of the same partition wall 10 in the cooling air flow direction is referred to as a downstream cooling passage 4D.

For example, the cooling passage 4e is the upstream cooling passage 4U with respect to the partition wall 10e, but is also the downstream cooling passage 4D with respect to the partition wall 10d.

The upstream cooling passage 4U is disposed adjacent to the leading edge 18 side of the downstream cooling passage 4D. Accordingly, in the following description, the upstream cooling passage 4U is also referred to as a leading-edge-side cooling passage 4U. Further, the downstream cooling passage 4D is disposed adjacent to the trailing edge 19 side of the upstream cooling passage 4U. Accordingly, in the following description, the downstream cooling passage 4D is also referred to as a trailing-edge-side cooling passage 4D.

A joint structure between the partition wall 10 and the blade body 3 forming the serpentine passage 5 (leading-edge-side serpentine passage 6, trailing-edge-side serpentine passage 7) will be described with reference to FIGS. 2, 4A, and 4B.

The partition wall 10 serves as a separation that divides the cooling passage 4 and forms the serpentine passage 5 (leading-edge-side serpentine passage 6, trailing-edge-side serpentine passage 7). The partition wall 10 can be integrally formed with the blade walls 13 and 14 by casting. The partition wall 10 extends in the radial direction from the tip 17a side to the base 17b side except the turning portions 4g, 4i on the tip 17a side and the turning portions 4h, 4j on the base 17b side to form each passage.

With reference to FIG. 4B, the cross-sectional structure around the partition wall 10, 10e when the blade body is viewed in the radial direction will be described. The partition wall 10 is formed so as to smoothly contact the pressure-side inner wall surface 13a and the suction-side inner wall surface 14a. Specifically, joint portions 10A1, 10A2, 10B1, 10B2 which form a part of the partition wall 10 and contact the inner wall surfaces 13a, 14a of the blade body 3 have a curved shape for manufacturing convenience. When points P11, P12, P21, P22 are inner edges at which the joint portions 10A1, 10A2, 10B1, 10B2 contact the inner wall surfaces 13a, 14a of the blade body 3, respectively, the ends of the joint portions 10A1, 10A2, 10B1, 10B2 in contact with the inner wall surfaces 13a, 14a correspond to the points P11, P12, P21, P22. When the position where the camber line C defining the center axis of the blade body 3 in the leading-edge-to-trailing-edge direction intersects the partition wall is referred to as, on the leading edge side, point P51, and on the trailing edge side, point P52, the length between the points P51 and P52 corresponds to the minimum thickness of the partition wall 10. In the following description, a line segment connecting two points is also expressed by reference signs of the points and hyphen therebetween. For example, the line segment connecting the points P51 and P52 is also simply expressed by P51-P52.

As shown in FIG. 4B, when points P13, P14, P23, P24 are positions where lines passing through each inner edge P11, P12, P21, P22 and parallel to the center line Wx of the partition wall 10 intersect the pressure-side blade wall 13 or the suction-side blade wall 14 which are the outer surface of the blade body 3, the region surrounded by the points P11, P12, P13, and P14 is referred to as a pressure-side partition wall joint region 52, and the region surrounded by the points P21, P22, P23, and P24 is referred to as a suction-side partition wall joint region 53. As shown in FIG. 4B, since both the pressure-side partition wall joint region 52 and the suction-side partition wall joint region 53 are not in direct contact with the cooling passage 4, these regions are difficult to cool by the cooling fluid. A region including the pressure-side partition wall joint region 52 and the suction-side partition wall joint region 53 will be collectively referred to as a partition wall joint region 51. The length in the leading-edge-to-trailing-edge direction between the inner edges P11 and P12, which form the inner side of the pressure-side partition wall joint region 52, and the length in the leading-edge-to-trailing-edge direction between the inner edges P21 and P22, which form the inner side of the suction-side partition wall joint region 53, are both greater than the thickness of the partition wall 10 (minimum thickness P51-P52). In other words, the widths of the pressure-side partition wall joint region 52 and the suction-side partition wall joint region 53 in the leading-edge-to-trailing-edge direction are greater than the thickness of the partition wall 10. The center line Wx of the partition wall 10 is defined by a straight line that connects the midpoint of a line (boundary line P11-P12) connecting the inner edges P11 and P12 formed on the inner wall surface 13a of the pressure-side blade wall 13, the midpoint of a line (boundary line P21-P22) connecting the inner edges P21 and P22 formed on the inner wall surface 14a of the suction-side blade wall 14, and the midpoint of the minimum thickness P51-P52 of the partition wall.

The pressure-side blade wall 13 and the suction-side blade wall 14 are connected by the partition wall 10. Accordingly, thermal expansion occurs in the blade walls 13, 14 due to heat input from the combustion gas side. On the other hand, since the joint portions between the partition wall 10 and the blade walls 13, 14 are constrained by the partition wall 10, a large thermal stress tends to occur in the pressure-side partition wall joint region 52 and the suction-side partition wall joint region 53, which are the joint portions between the partition wall 10 and the blade walls 13, 14. In addition, since the pressure-side partition wall joint region 52 and the suction-side partition wall joint region 53 are not in direct contact with the cooling passage 4, its metal temperature is likely to increase due to heat input from the combustion gas side. On the other hand, since the partition wall 10 is in direct contact with the cooling passage 4 (upstream cooling passage 4U and downstream cooling passage 4D) on both upstream and downstream sides in the cooling air flow direction, its metal temperature is relatively decreased. Such a temperature difference tends to further increase the thermal stress.

The longer the boundary lines P11-P12, P21-P22 (lines connecting inner edges P11 and P12 or inner edges P21 and P22) which defines the positions of the pressure-side partition wall joint region 52 and the suction-side partition wall joint region 53 at the inner wall surfaces 13a, 14a, the more difficult it is to cool the pressure-side partition wall joint region 52 and the suction-side partition wall joint region 53, and the higher the thermal stress.

Therefore, as shown in FIG. 4B, the first cooling hole 31, 32, 33 and the second cooling hole 41, 42, 43 are arranged in order to cool the pressure-side partition wall joint region 52 and the suction-side partition wall joint region 53. The arrangement will be described in detail later.

It is conceivable that the pressure-side partition wall joint region 52 and the suction-side partition wall joint region 53 are cooled by only one of the first cooling hole 31, 32, 33 or the second cooling hole 41, 42, 43. In the case of a blade structure in which heat input from the combustion gas flow is relatively small and the thermal stress is not high, cooling may be possible by only one of the cooling holes. However, in the case of a blade structure in which heat input from the combustion gas side is large due to structural constraints and the thermal stress is high, cooling with only one cooling hole may result in insufficient cooling and fail to suppress the occurrence of excessive thermal stress.

An example will be described with reference to FIG. 4B. Consider the case where only the pressure-side first cooling hole 32 is provided to cool the pressure-side partition wall joint region 52. In this case, the opening of the pressure-side first cooling hole 32 formed in the inner wall surface 13a, i.e., the pressure-side first inlet opening 32A, should be disposed offset to the trailing edge side from the position of the inner edge P11 so as not to interfere with at least the inner edge P11 of the joint portion 10A1 of the partition wall 10.

Meanwhile, the other opening of the pressure-side first cooling hole 32 formed in the outer wall surface 13b, i.e., the pressure-side first outlet opening 32B, preferably extends to near the boundary line P12-P14 (La2) which defines the position of the leading edge side of the pressure-side partition wall joint region 52. However, for disposing the pressure-side first inlet opening 32A offset to the trailing edge side from the inner edge P11 while extending the pressure-side first outlet opening 32B to near the boundary line P12-P14 on the leading edge side to form the pressure-side first cooling hole 32 inside the pressure-side blade wall 13, it is desirable that the central axis (AXa1) of the pressure-side first cooling hole 32 has a small inclination angle θ (FIG. 4B) with respect to the pressure-side blade wall 13 or the pressure-side inner wall surface 13a. The cooling hole is generally formed by electric discharge machining or machining, but since the inclination angle of the machining nozzle with respect to the blade outer surface is limited, the hole machining is difficult when the inclination of the machining nozzle with respect to the central axis (camber line C) in the leading-edge-to-trailing-edge direction is small. The same situation applies to the suction-side first cooling hole 33 and the second cooling hole 41, 42, 43.

Further, when the pressure-side partition wall joint region 52 and the suction-side partition wall joint region 53 are cooled only by the first cooling hole 31, 32, 33, the cooling may be insufficient. Specifically, the cooling air flowing through the cooling passage 4f and supplied to the first cooling hole 31, 32, 33 has a pressure lower than that of the cooling air supplied to the second cooling hole 41, 42, 43 opening to the cooling passage 4e. However, for cooling the pressure-side partition wall joint region 52 and the suction-side partition wall joint region 53 only by the first cooling hole 31, 32, 33, the first cooling hole 31, 32, 33 needs to extend to the vicinity of the boundary lines P12-P14 and P22-P24 on the leading edge side of the partition wall joint region 51, 52, 53. If the length of the cooling hole increases, the pressure loss increases, while the differential pressure between the combustion gas and the cooling passage 4f decreases. Therefore, depending on operating conditions, the flow rate of the cooling air flowing through the first cooling hole 31, 32, 33 may become insufficient.

In the turbine blade as described above, the arrangement with only the first cooling holes 31, 32, 33 may result in insufficient cooling, and the combination of the first cooling holes 31, 32, 33 and the second cooling holes 41, 42, 43 may be desired.

With a decrease in distance to the trailing edge, the blade width of the blade body 3 decreases, and the flow passage width of the cooling passage 4 in the pressure-suction direction decreases. Therefore, the cooling passage 4 has a deformed flow passage shape such as a trapezoidal shape, a rhombus shape, or a triangular shape in which the flow passage width in the pressure-suction direction is small, and the flow passage length in the leading-edge-to-trailing-edge direction is long. Accordingly, the cross-sectional shape of the partition wall 10 connecting the inner wall surfaces 13a and 14a also tends to be deformed into a rhombus shape, and the inclination of the center line Wx of the partition wall 10 with respect to the camber line C tends to decrease. When the inclination of the center line Wx of the partition wall 10 with respect to the camber line C decreases, the curvature of the joint portions 10A1, 10A2, 10B1, 10B2 of the partition wall 10 increases, and the lengths in the leading-edge-to-trailing-edge direction of the pressure-side partition wall joint region 52 and the suction-side partition wall joint region 53 increases relative to the thickness of the partition wall 10 (P51-P52), so that it becomes further difficult to cool the pressure-side partition wall joint region 52 and the suction-side partition wall joint region 53. In such a case, in view of the installation space, it is desirable to arrange a plurality of cooling holes in each of the pressure-side partition wall joint region 52 and the suction-side partition wall joint region 53. Specifically, it is preferred that the first cooling hole 31, 32, 33 and the second cooling hole 41, 42, 43 are combined, i.e., it is preferred to select the combination of the pressure-side first cooling hole 32 and the pressure-side second cooling hole 42 or the combination of the suction-side first cooling hole 33 and the suction-side second cooling hole 43.

The pressure-side partition wall joint region 52 is defined by a boundary line La2 that defines the position of the leading edge side in the leading-edge-to-trailing-edge direction and a boundary line La1 that defines the position of the trailing edge side in the leading-edge-to-trailing-edge direction. The suction-side partition wall joint region 53 is defined by a boundary line Lb2 that defines the position of the leading edge side in the leading-edge-to-trailing-edge direction and a boundary line Lb1 that defines the position of the trailing edge side in the leading-edge-to-trailing-edge direction. Unless it is necessary to distinguish the pressure-side partition wall joint region 52 and the suction-side partition wall joint region 53, in the following description, they are simply referred to as the partition wall joint region 51.

As shown in FIGS. 4A, 4B, and 7, in some embodiments, the cooling passage 4 includes a trailing-edge-side cooling passage (downstream cooling passage) 4D communicating with the pressure-side first cooling hole 32 and the suction-side first cooling hole 33, and a leading-edge-side cooling passage (upstream cooling passage) 4U disposed adjacent to the leading edge 18 side of the trailing-edge-side cooling passage 4D.

The blade body 3 includes a pressure-side second cooling hole 42 which communicates at one end (third end) with the leading-edge-side cooling passage 4U via a pressure-side second inlet opening 42A formed in the inner wall surface 13a of the pressure-side blade wall 13, and communicates at the other end (fourth end) with a pressure-side second outlet opening 42B formed in the outer wall surface 13b of the blade body 3. The pressure-side second cooling hole 42 extends in the direction of the trailing edge 19 from the pressure-side second inlet opening 42A to the pressure-side second outlet opening 42B.

Further, as shown in FIGS. 4A, 4B, and 7, in some embodiments, the blade body 3 includes a suction-side second cooling hole 43 which communicates at one end (third end) with the leading-edge-side cooling passage 4U via a suction-side second inlet opening 43A formed in the inner wall surface 14a of the suction-side blade wall 14, and communicates at the other end (fourth end) with a suction-side second outlet opening 43B formed in the outer wall surface 14b of the blade body 3. The suction-side second cooling hole 43 extends in the direction of the trailing edge 19 from the suction-side second inlet opening 43A to the suction-side second outlet opening 43B.

Since the blade body 3 includes at least one of the pressure-side first cooling hole 32 or the suction-side first cooling hole 33, it is possible to convectively cool a region of the blade body 3 joined to the partition wall 10 between the formation positions of the first inlet opening 31A and the first outlet opening 31B. More specifically, it is possible to convectively cool a region joined to the partition wall 10 between the formation positions of the pressure-side first inlet opening 32A and the pressure-side first outlet opening 32B or a region joined to the partition wall 10 between the formation positions of the suction-side first inlet opening 33A and the suction-side first outlet opening 33B.

Further, since the blade body 3 includes at least one of the pressure-side second cooling hole 42 or the suction-side second cooling hole 43, it is possible to convectively cool at least one of a region joined to the partition wall 10 between the formation positions of the pressure-side second inlet opening 42A and the pressure-side second outlet opening 42B or a region joined to the partition wall 10 between the formation positions of the suction-side second inlet opening 43A and the suction-side second outlet opening 43B.

With the above configuration, it is possible to convectively cool a region joined to the partition wall 10 between the formation positions of the second inlet opening 42A, 42A, 43A and the second outlet opening 41B, 42B, 43B which is difficult to cool.

Further, the cooling air discharged from at least one of the pressure-side second outlet opening 42B or the suction-side second outlet opening 43B and flowing on the trailing edge side along the blade surface film cools at least one of the outer surface of the blade body on the trailing edge side with respect to the pressure-side second outlet opening 42B or the outer surface of the blade body on the trailing edge side with respect to the suction-side second outlet opening 43B. Thus, it is possible to more effectively cool the blade body 3 by combination of the cooling effect by at least one of the pressure-side first cooling hole 32 or the suction-side first cooling hole 33 and the cooling effect of at least one of the pressure-side second cooling hole 42 or the suction-side second cooling hole 43. Accordingly, it is possible to more effectively cool a portion of the blade body 3 where the temperature tends to increase by combination of two cooling holes.

The blade body 3 may have at least one of the pressure-side second cooling hole 42 or the suction-side second cooling hole 43. When the blade body 3 has both the pressure-side second cooling hole 42 and the suction-side second cooling hole 43, it is possible to efficiently cool the blade body 3 from both pressure and suction sides.

As shown in FIGS. 4A, 4B, and 7, in some embodiments, at least a part of the pressure-side first cooling hole 32 passes through the pressure-side partition wall joint region 52.

As shown in FIGS. 4A, 7, and 9, in some embodiments, at least a part of the pressure-side second cooling hole 42 passes through the pressure-side partition wall joint region 52.

As shown in FIGS. 4A, 4B, and 7, in some embodiments, at least a part of the suction-side first cooling hole 33 passes through the suction-side partition wall joint region 53.

As shown in FIGS. 4A, 4B, and 7, in some embodiments, at least a part of the suction-side second cooling hole 43 passes through the suction-side partition wall joint region 53.

Figure 5:
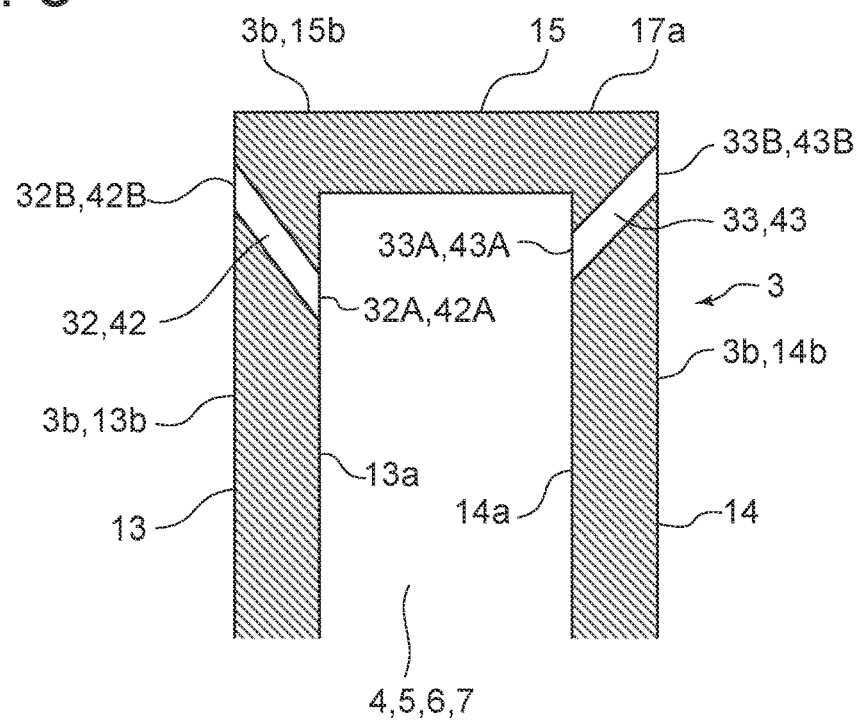
FIG. 5 is a schematic cross-sectional view for describing the extension state of each cooling hole in the blade body of the turbine rotor blade according to the embodiment shown in FIG. 4A.
Figure 6:
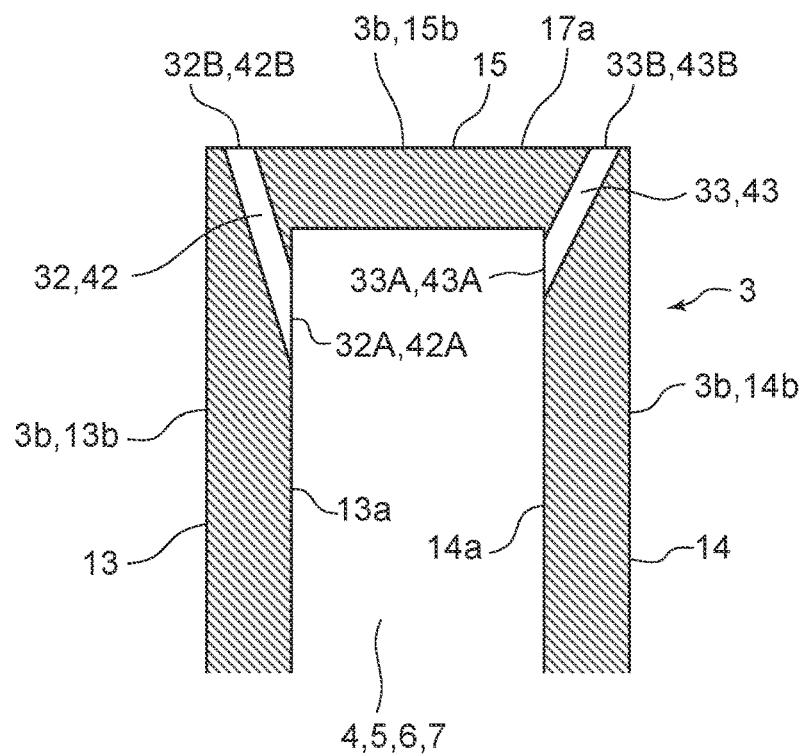
FIG. 6 is a schematic cross-sectional view for describing the extension state of each cooling hole according to another embodiment different from each cooling hole in the blade body of the turbine rotor blade according to the embodiment shown in FIG. 4A.
Figure 8:
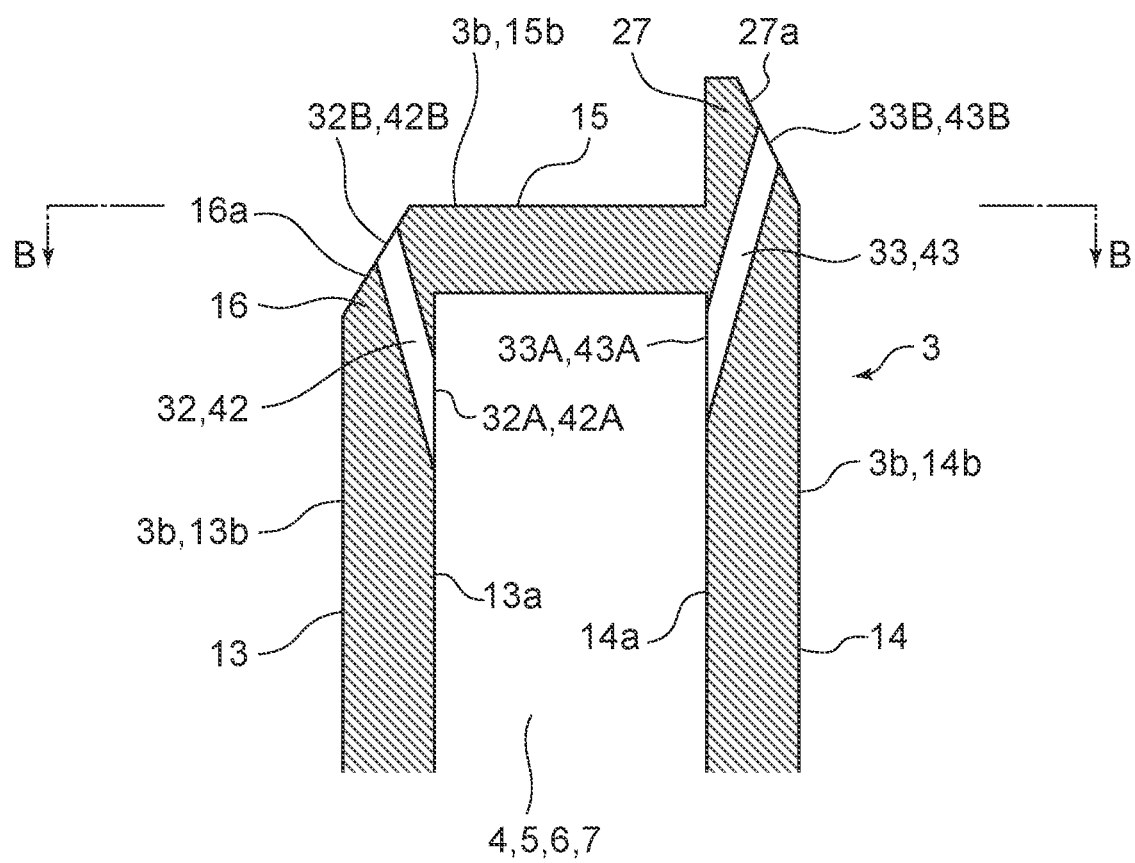
FIG. 8 is a schematic cross-sectional view for describing the extension state of each cooling hole in the blade body of the turbine rotor blade according to the embodiment shown in FIG. 7.

FIG. 5 is a schematic cross-sectional view for describing the extension state of the cooling holes 32, 33, 42, 43 in the blade body 3 of the turbine rotor blade 1 according to the embodiment shown in FIG. 4A. FIG. 6 is a schematic cross-sectional view for describing the extension state of the cooling holes 32, 33, 42, 43 according to another embodiment different from each cooling hole 32, 33, 42, 43 in the blade body 3 of the turbine rotor blade 1 according to the embodiment shown in FIG. 4A. FIG. 7 is a view of the vicinity of the trailing edge of the turbine rotor blade 1 according to another embodiment, viewed from the tip 17a side of the turbine rotor blade 1. FIG. 8 is a schematic cross-sectional view for describing the extension state of the cooling holes 32, 33, 42, 43 in the blade body 3 of the turbine rotor blade 1 according to the embodiment shown in FIG. 7.

The cross-sections of the cooling holes 32, 33, 42, 43 shown in FIGS. 5, 6, and 8 are schematic cross-sections cut along the extending direction of each cooling hole 32, 33, 42, 43 and projected from the leading edge 18 side.

In some embodiments shown in FIGS. 4A, 4B, and 7, the cooling holes 32, 33, 42, 43 are disposed in upstream and downstream blade walls across the partition wall 10e positioned on the most downstream side along the cooling air flow. The cooling holes 32, 33, 42, 43 are configured to be supplied with the cooling air from the upstream cooling passage 4U positioned on the upstream side or the downstream cooling passage 4D positioned on the downstream side. However, the cooling holes 32, 33, 42, 43 may be configured to be supplied with the cooling air from the upstream cooling passage 4U or the downstream cooling passage 4D positioned on the upstream and downstream sides across any of the partition walls 10a to 10d other than the partition wall 10e. In the following description, even referring to FIG. 4A, 4B or 7, unless otherwise mentioned, it is intended that the cooling holes 32, 33, 42, 43 are configured to be supplied with the cooling air from the upstream cooling passage 4U or the downstream cooling passage 4D positioned on the upstream and downstream sides across any of the partition walls 10a to 10e.

As shown in FIGS. 4A, 4B, and 7, in some embodiments, the blade body 3 has the pressure-side first cooling hole 32, the suction-side first cooling hole 33, and the suction-side second cooling hole 43. However, when the blade body 3 has at least one of the cooling holes 32, 33, 42, 43, it is possible to cool the partition wall joint region 51 through which at least a part of the at least one cooling hole passes.

For instance, the blade body 3 may have at least one of the pressure-side first cooling hole 32 or the suction-side first cooling hole 33.

As shown in FIGS. 4A, 4B and 7, in some embodiments, the length in the leading-edge-to-trailing-edge direction, i.e., the length in the chord direction connecting the leading edge 18 and the trailing edge 19, between the position of the pressure-side first outlet opening 32B of the pressure-side first cooling hole 32 and the position of the pressure-side second outlet opening 42B of the pressure-side second cooling hole 42 is less than the length in the leading-edge-to-trailing-edge direction between the position of the pressure-side first inlet opening 32A and the position of the pressure-side second inlet opening 42A.

With this configuration, the pressure-side first cooling hole 32 and the pressure-side second cooling hole 42 disposed opposite sides of the partition wall 10e come closer to the partition wall 10e as they come closer to the pressure-side first outlet opening 32B and the pressure-side second outlet opening 42B, respectively, so that it is possible to enhance the cooling of a region of the partition wall 10 which is difficult to cool.

Similarly, as shown in FIGS. 4A, 4B and 7, in some embodiments, the length in the leading-edge-to-trailing-edge direction between the position of the suction-side first outlet opening 33B of the suction-side first cooling hole 33 and the position of the suction-side second outlet opening 43B of the suction-side second cooling hole 43 is less than the length in the leading-edge-to-trailing-edge direction between the position of the suction-side first inlet opening 33A and the position of the suction-side second inlet opening 43A.

With this configuration, the suction-side first cooling hole 33 and the suction-side second cooling hole 43 disposed across the partition wall 10e come closer to the partition wall 10e as they come closer to the suction-side first outlet opening 33B and the suction-side second outlet opening 43B, respectively, so that it is possible to enhance the cooling of a region of the partition wall 10 which is difficult to cool.

In the embodiment shown in FIGS. 4A and 4B, the length in the leading-edge-to-trailing-edge direction between the position of the pressure-side first outlet opening 32B of the pressure-side first cooling hole 32 and the position of the pressure-side second outlet opening 42B of the pressure-side second cooling hole 42 is less than the thickness of the partition wall 10e.

Similarly, in the embodiment shown in FIGS. 4A and 4B, the length in the leading-edge-to-trailing-edge direction between the position of the suction-side first outlet opening 33B of the suction-side first cooling hole 33 and the position of the suction-side second outlet opening 43B of the suction-side second cooling hole 43 is less than the thickness of the partition wall 10e.

In some embodiments, among the leading-edge-side cooling passage 4U and the trailing-edge-side cooling passage 4D disposed adjacent to each other across the partition wall 10, the leading-edge-side cooling passage 4U communicates with the pressure-side second cooling hole 42 and the suction-side second cooling hole 43, and the trailing-edge-side cooling passage 4D communicates with the pressure-side first cooling hole 32 and the suction-side first cooling hole 33.

Accordingly, when the length in the leading-edge-to-trailing-edge direction between the position of the pressure-side first outlet opening 32B of the pressure-side first cooling hole 32 and the position of the pressure-side second outlet opening 42B of the pressure-side second cooling hole 42 is less than the thickness of the partition wall 10e, the pressure-side first cooling hole 32 and the pressure-side second cooling hole 42 come closer to the partition wall 10e, so that the cooling of the pressure-side partition wall joint region 52 is enhanced.

Similarly, when the length in the leading-edge-to-trailing-edge direction between the position of the suction-side first outlet opening 33B of the suction-side first cooling hole 33 and the position of the suction-side second outlet opening 43B of the suction-side second cooling hole 43 is less than the thickness of the partition wall 10e, the suction-side first cooling hole 33 and the suction-side second cooling hole 43 come closer to the partition wall 10e, so that the cooling of the suction-side partition wall joint region 53 is enhanced.

Thus, the pressure-side partition wall joint region 52 which is more difficult to cool than the region of the pressure-side blade wall 13 facing the cooling passage 4 can be cooled by the cooling air flowing through at least one of the pressure-side first cooling hole 32 or the pressure-side second cooling hole 42. Similarly, the suction-side partition wall joint region 53 which is more difficult to cool than the region of the suction-side blade wall 14 facing the cooling passage 4 can be cooled by the cooling air flowing through at least one of the suction-side first cooling hole 33 or the suction-side second cooling hole 43.

For instance, in the embodiment shown in FIG. 6, the pressure-side first cooling hole 32 and the pressure-side second cooling hole 42 have the pressure-side first inlet opening 32A and the pressure-side second inlet opening 42A formed so as to face the serpentine passage 5, and the pressure-side first outlet opening 32B and the pressure-side second outlet opening 42B formed in the surface (outer wall surface) 15b of the top panel 15, respectively. The pressure-side first outlet opening 32B of the pressure-side first cooling hole 32 is formed closer to the outer wall surface 13b of the blade body 3 than the pressure-side first inlet opening 32A of the pressure-side first cooling hole 32 is along the thickness of the thickness of the pressure-side blade wall 13.

The pressure-side second outlet opening 42B of the pressure-side second cooling hole 42 is formed closer to the outer wall surface 13b of the blade body 3 than the pressure-side second inlet opening 42A of the pressure-side second cooling hole 42 is along the thickness of the thickness of the pressure-side blade wall 13.

Generally, in the turbine rotor blade 1, when the combustion gas passes between the top panel 15 and the turbine casing (casing) 122 facing the top panel 15, the flow velocity of the combustion gas increases because a space between the top panel 15 and the casing 122 is small, so that the heat transfer rate to the blade body 3 increases. Thus, heat load on the top panel 15 is higher than that on the other portions.

When, as in the embodiment shown in FIG. 6, the pressure-side first outlet opening 32B of the pressure-side first cooling hole 32 and the pressure-side second outlet opening 42B of the pressure-side second cooling hole 42 are formed in the surface 15b of the top panel 15 so as to be positioned closer to the outer wall surface 13b of the blade body 3 than the pressure-side first inlet opening 32A of the pressure-side first cooling hole 32 and the pressure-side second inlet opening 42A of the pressure-side second cooling hole 42 are, respectively, along the thickness direction of the pressure-side blade wall 13, it is possible to cool the pressure-side partition wall joint region 52 while effectively cooling the top panel 15, which is exposed to higher heat load than on the other portions, by the cooling air flowing from the pressure-side first inlet opening 32A and the pressure-side second inlet opening 42A into the pressure-side first cooling hole 32 and the pressure-side second cooling hole 42.

Either one of the pressure-side first outlet opening 32B of the pressure-side first cooling hole 32 or the pressure-side second outlet opening 42B of the pressure-side second cooling hole 42 may have the above configuration.

The same configuration may apply to the suction side. Specifically, for instance, in the embodiment shown in FIG. 6, the suction-side first cooling hole 33 and the suction-side second cooling hole 43 have the suction-side first inlet opening 33A and the suction-side second inlet opening 43A formed so as to face the serpentine passage 5, and the suction-side first outlet opening 33B and the suction-side second outlet opening 43B formed in the outer wall surface 15b of the top panel 15, respectively.

The suction-side first outlet opening 33B of the suction-side first cooling hole 33 is formed closer to the outer wall surface 14b of the blade body 3 than the suction-side first inlet opening 33A of the suction-side first cooling hole 33 is along the thickness of the thickness of the suction-side blade wall 14.

The suction-side second outlet opening 43B of the suction-side second cooling hole 43 is formed closer to the outer wall surface 14b of the blade body 3 than the suction-side second inlet opening 43A of the suction-side second cooling hole 43 is along the thickness of the thickness of the suction-side blade wall 14.

With this configuration, it is possible to cool the suction-side partition wall joint region 53 while effectively cooling the top panel 15, which is exposed to higher heat load than on the other portions, by the cooling air flowing from the suction-side first inlet opening 33A and the suction-side second inlet opening 43A into the suction-side first cooling hole 33 and the suction-side second cooling hole 43.

Either one of the suction-side first outlet opening 33B of the suction-side first cooling hole 33 or the suction-side second outlet opening 43B of the suction-side second cooling hole 43 may have the above configuration.

For instance, in the embodiment shown in FIG. 5, the pressure-side first cooling hole 32 and the pressure-side second cooling hole 42 have the pressure-side first inlet opening 32A and the pressure-side second inlet opening 42A formed so as to face the serpentine passage 5, and the pressure-side first outlet opening 32B and the pressure-side second outlet opening 42B formed in the surface of the pressure-side blade wall 13, respectively.

The pressure-side first outlet opening 32B of the pressure-side first cooling hole 32 is formed closer to the tip 17a than the pressure-side first inlet opening 32A of the pressure-side first cooling hole 32 is.

The pressure-side second outlet opening 42B of the pressure-side second cooling hole 42 is formed closer to the tip 17a than the pressure-side second inlet opening 42A of the pressure-side second cooling hole 42 is.

As described above, generally, in the turbine rotor blade 1, since heat load on the top panel 15 is higher than that on the other portions, the temperature of the blade wall in the vicinity of the tip 17a tends to increase due to heat transfer from the top panel 15 as it approaches the tip 17a.

When, as in the embodiment shown in FIG. 5, the pressure-side first outlet opening 32B of the pressure-side first cooling hole 32 and the pressure-side second outlet opening 42B of the pressure-side second cooling hole 42 are formed in the surface of the pressure-side blade wall 13 so as to be positioned closer to the tip 17a than the pressure-side first inlet opening 32A of the pressure-side first cooling hole 32 and the pressure-side second inlet opening 42A of the pressure-side second cooling hole 42 are, respectively, it is possible to cool the pressure-side blade wall 13 in the vicinity of the tip 17a while cooling the pressure-side partition wall joint region 52 by the cooling air flowing from the inlet openings 32A, 42A into the pressure-side first cooling hole 32 and the pressure-side second cooling hole 42.

Either one of the pressure-side first outlet opening 32B of the pressure-side first cooling hole 32 or the pressure-side second outlet opening 42B of the pressure-side second cooling hole 42 may have the above configuration.

The same configuration may apply to the suction side. Specifically, for instance, in the embodiment shown in FIG. 5, the suction-side first cooling hole 33 and the suction-side second cooling hole 43 have the suction-side first inlet opening 33A and the suction-side second inlet opening 43A formed so as to face the serpentine passage 5 (leading-edge-side serpentine passage 6, trailing-edge-side serpentine passage 7), and the suction-side first outlet opening 33B and the suction-side second outlet opening 43B formed in the surface of the suction-side blade wall 14, respectively.

The suction-side first outlet opening 33B of the suction-side first cooling hole 33 is formed closer to the tip 17a than the suction-side first inlet opening 33A of the suction-side first cooling hole 33 is.

The suction-side second outlet opening 43B of the suction-side second cooling hole 43 is formed closer to the tip 17a than the suction-side second inlet opening 43A of the suction-side second cooling hole 43 is.

With this configuration, it is possible to effectively cool the suction-side blade wall 14 in the vicinity of the tip 17a while cooling the suction-side partition wall joint region 53 by the cooling air flowing from the suction-side first inlet opening 33A and the suction-side second inlet opening 43A into the suction-side first cooling hole 33 and the suction-side second cooling hole 43. Either one of the suction-side first outlet opening 33B of the suction-side first cooling hole 33 or the suction-side second outlet opening 43B of the suction-side second cooling hole 43 may have the above configuration.

In the embodiment shown in FIGS. 7 and 8, a connection portion 16 between the pressure-side blade wall 13 and the top panel 15 in the blade body 3 is provided with an inclined surface 16a inclined with respect to both the pressure-side blade wall 13 and the top panel 15 on the outer side of the blade body 3 for suppressing turbulence of the combustion gas flow in the vicinity of the connection portion or for chamfering the connection portion.

Further, the blade body 3 according to some embodiments may have a squealer rib 27 at the top panel 15, as shown in FIGS. 7 and 8 for example, for reducing loss due to leak flow through a clearance between the top panel 15 and the casing 122 facing the top panel 15.

In the embodiment shown in FIGS. 7 and 8, the blade body 3 includes a connection portion 16 disposed between the pressure-side blade wall 13 and the top panel 15 and having an inclined surface 16a inclined with respect to both the pressure-side blade wall 13 and the top panel 15 on the outer side of the blade body 3.

The pressure-side first cooling hole 32 and the pressure-side second cooling hole 42 have the inlet openings 32A, 42A formed so as to face the serpentine passage 5, and the outlet openings 32B, 42B formed in the inclined surface 16a of the connection portion 16, respectively. When the connection portion 16 between the pressure-side blade wall 13 and the top panel 15 has the inclined surface 16a, separation of the combustion gas flowing from the pressure-side blade wall to the top panel 15 is reduced, and overheating of the top panel 15 due to turbulence of the combustion gas flow is suppressed.

As described above, generally, in the turbine rotor blade 1, heat load on the top panel 15 tends to be higher than that on the other portions.

Further, in the embodiment shown in FIGS. 7 and 8, as described above, the connection portion 16 having the inclined surface 16a is provided.

When, as in the embodiment shown in FIGS. 7 and 8, the outlet openings 32B, 42B of the pressure-side first cooling hole 32 and the pressure-side second cooling hole 42 are formed in the inclined surface 16a, it is possible to effectively cool the connection portion 16 between the pressure-side blade wall 13 and the top panel 15 in the vicinity of the tip 17a while cooling the top panel 15, which is exposed to higher heat load than on the other portions, by the cooling air flowing into the pressure-side first cooling hole 32 and the pressure-side second cooling hole 42.

Either one of the outlet openings 32B, 42B of the pressure-side first cooling hole 32 or the pressure-side second cooling hole 42 may have the above configuration.

Although not depicted, as with the inclined surface 16a in the embodiment shown in FIGS. 7 and 8, when a connection portion between the suction-side blade wall 14 and the top panel 15 has an inclined surface inclined with respect to both the suction-side blade wall 14 and the top panel 15 on the outer side of the blade body 3, the outlet openings 33B, 43B of the suction-side first cooling hole 33 and the suction-side second cooling hole 43 may be formed in the inclined surface in the same way as the above configuration.

With this configuration, it is possible to effectively cool a region of the suction-side partition wall joint region 53 in the vicinity of the tip 17a where the temperature tends to increase, while cooling the top panel 15, which is exposed to higher heat load than on the other portions, by the cooling air flowing from into the suction-side first cooling hole 33 and the suction-side second cooling hole 43.

Either one of the outlet openings 33B, 43B of the suction-side first cooling hole 33 or the suction-side second cooling hole 43 may have the above configuration.

Further, as shown in FIGS. 7 and 8, when a squealer rib 27 is disposed at the top panel 15, the outlet openings 33B, 43B of the suction-side first cooling hole 33 and the suction-side second cooling hole 43 may be formed in the squealer rib 27, in the same way as the above configuration.

As shown in FIGS. 7 and 8, when the squealer rib 27 has an inclined surface 27a inclined with respect to both the suction-side blade wall 14 and the top panel 15, the outlet openings 33B, 43B of the suction-side first cooling hole 33 and the suction-side second cooling hole 43 may be formed in the inclined surface 27a of the squealer rib 27. With this configuration, similarly, it is possible to effectively cool the suction-side blade wall 14 and the squealer rib 27 in the vicinity of the tip 17a while cooling the top panel 15 exposed to higher heat load than on the other portions.

For instance, in the embodiments shown in FIGS. 4A and 7, the pressure-side first cooling hole 32 and the pressure-side second cooling hole 42 have the inlet openings 32A, 42A formed so as to face the serpentine passage 5, and the outlet openings 32B, 42B formed in the surface of the blade body 3 such that the center positions of the openings are disposed in the pressure-side partition wall joint region 52, respectively. Here, the surface of the blade body 3 includes not only the surfaces of the blade walls 13, 14, but also the surfaces of the top panel 15, the connection portion 16, and the squealer rib 27.

Thus, in the embodiments shown in FIGS. 4A and 7, since the outlet openings 32B, 42B of the pressure-side first cooling hole 32 and the pressure-side second cooling hole 42 are formed in the surface of the blade body 3 such that the center positions thereof are disposed in the pressure-side partition wall joint region 52, a distance at which the pressure-side first cooling hole 32 and the pressure-side second cooling hole 42 pass through the pressure-side partition wall joint region 52 is increased compared with the case where the center positions of the outlet openings 32B, 42B are not disposed in the pressure-side partition wall joint region 52. Thus, it is possible to effectively cool the pressure-side partition wall joint region 52.

Further, when the outlet openings 32B, 42B of the pressure-side first cooling hole 32 and the pressure-side second cooling hole 42 are formed in the surface of the blade body 3 such that the center positions thereof are disposed in the pressure-side partition wall joint region 52, it is possible to effectively cool the blade surface in the pressure-side partition wall joint region 52 by the cooling air flowing out of the outlet openings 32B, 42B.

Either one of the outlet openings 32B, 42B of the pressure-side first cooling hole 32 or the pressure-side second cooling hole 42 may have the above configuration.

The same configuration may apply to the suction side. For instance, in the embodiments shown in FIGS. 4A and 7, the suction-side first cooling hole 33 and the suction-side second cooling hole 43 have the inlet openings 33A, 43A formed so as to face the serpentine passage 5, and the outlet openings 33B, 43B formed in the surface of the blade body 3 such that the center positions thereof are disposed in the suction-side partition wall joint region 53, respectively.

When the outlet openings 33B, 43B of the suction-side first cooling hole 33 and the suction-side second cooling hole 43 are formed as described above, a distance at which the suction-side first cooling hole 33 and the suction-side second cooling hole 43 pass through the suction-side partition wall joint region 53 is increased compared with the case where the center positions of the outlet openings 33B, 43B are not disposed in the suction-side partition wall joint region 53. Thus, it is possible to effectively cool the suction-side partition wall joint region 53.

Further, when the outlet openings 33B, 43B of the suction-side first cooling hole 33 and the suction-side second cooling hole 43 are formed in the surface of the blade body 3 such that the center positions thereof are disposed in the suction-side partition wall joint region 53, it is possible to effectively cool the blade surface in the suction-side partition wall joint region 53 by the cooling air flowing out of the outlet openings 33B, 43B.

Either one of the outlet openings 33B, 43B of the suction-side first cooling hole 33 or the suction-side second cooling hole 43 may have the above configuration.

For instance, in FIGS. 4A and 7, the pressure-side first cooling hole 32 according to some embodiments has the inlet opening 32A formed so as to face the cooling passages 4c, 4f extending along the radial direction of the turbine rotor blade 1 on the most downstream side, i.e., at a position closest to the trailing edge 19, in the serpentine passage 5.

With this configuration, the cooling air discharged from the pressure-side first cooling hole 32 to the outside of the blade body 3 flows a longer distance along the serpentine passage 5 than when the pressure-side first inlet opening 32A of the pressure-side first cooling hole 32 is formed in any other cooling passages extending along the radial direction of the turbine rotor blade 1 on the upstream side of the cooling passages 4c, 4f, so that more heat can be drawn away from the blade body forming the cooling passages. Accordingly, the blade body 3 is further cooled by the cooling air discharged from the pressure-side first cooling hole 32 to the outside of the blade body 3. Consequently, it is possible to reduce the flow rate of the cooling air and suppress a reduction in turbine efficiency.

Both of the pressure-side first cooling hole 32 having the inlet opening 32A formed so as to face the cooling passage 4c of the leading-edge-side serpentine passage 6 and the pressure-side first cooling hole 32 having the inlet opening 32A formed so as to face the cooling passage 4f of the trailing-edge-side serpentine passage 7 may be formed, or either of them may be formed. The same configuration may apply to the suction side described below.

Specifically, for instance in FIGS. 4A and 7, the suction-side first cooling hole 33 according to some embodiments has the inlet opening 33A formed so as to face the cooling passages 4c, 4f extending along the radial direction of the turbine rotor blade 1 on the most downstream side, i.e., at a position closest to the trailing edge 19, in the serpentine passage 5.

With this configuration, the cooling air discharged from the suction-side first cooling hole 33 to the outside of the blade body 3 flows a longer distance along the serpentine passage 5 than when the suction-side first inlet opening 33A of the suction-side first cooling hole 33 is formed in any other cooling passages extending along the radial direction of the turbine rotor blade 1 on the upstream side of the cooling passages 4c, 4f, so that more heat can be drawn away from the blade body 3. Accordingly, the blade body 3 is further cooled by the cooling air discharged from the suction-side first cooling hole 33 to the outside of the blade body 3. Consequently, it is possible to reduce the flow rate of the cooling air and suppress a reduction in turbine efficiency.

For instance, in the embodiments shown in FIGS. 5, 6, and 8, the pressure-side first cooling hole 32 has the inlet opening 32A formed at a position facing the serpentine passage 5 and away from the top panel 15 to the base 17b side of the blade body 3.

At the connection portion between the top panel 15 and the pressure-side blade wall 13, thermal stress is likely to occur since the top panel 15 and the pressure-side blade wall 13 having different extending directions are connected to each other. In this regard, in the embodiments shown in FIGS. 5, 6, and 8, since the inlet opening 32A of the pressure-side first cooling hole 32 is formed at a position facing the serpentine passage 5 and away from the top panel 15 to the base 17b side of the blade body 3, it is possible to avoid that the inlet opening 32A is formed in a place where thermal stress is likely to occur.

The same configuration may apply to the suction side. Specifically, for instance, in the embodiments shown in FIGS. 5, 6, and 8, the suction-side first cooling hole 33 has the inlet opening 33A formed at a position facing the serpentine passage 5 and away from the top panel 15 to the base 17b side of the blade body 3.

At the connection portion between the top panel 15 and the suction-side blade wall 14, thermal stress is likely to occur since the top panel 15 and the suction-side blade wall 14 having different extending directions are connected to each other. In this regard, for instance in the embodiments shown in FIGS. 5, 6, and 8, since the inlet opening 33A of the suction-side first cooling hole 33 is formed at a position facing the serpentine passage 5 and away from the top panel 15 to the base 17b side of the blade body 3, it is possible to avoid that the inlet opening 33A is formed in a place where thermal stress is likely to occur.

For instance, in the embodiments shown in FIGS. 5, 6, and 8, the blade body 3 has the pressure-side first cooling hole 32 and the suction-side first cooling hole 33.

The pressure-side first cooling hole 32 and the suction-side first cooling hole 33 have the inlet openings 32A, 33A, respectively, each of which is formed at a position facing the serpentine passage 5 and away from the top panel 15 to the base 17b side of the blade body 3.

The inlet opening 32A of the pressure-side first cooling hole 32 is formed closer to the base 17b of the blade body 3 than the inlet opening 33A of the suction-side first cooling hole 33 is.

As described above, at the connection portion between the top panel 15 and the pressure-side blade wall 13, thermal stress is likely to occur since the top panel 15 and the pressure-side blade wall 13 having different extending directions are connected to each other.

Similarly, at the connection portion between the top panel 15 and the suction-side blade wall 14, thermal stress is likely to occur since the top panel 15 and the suction-side blade wall 14 having different extending directions are connected to each other. In this regard, for instance in the embodiments shown in FIGS. 5, 6, and 8, since the inlet openings 32A, 33A of the pressure-side first cooling hole 32 and the suction-side first cooling hole 33 are formed at positions facing the serpentine passage 5 and away from the top panel 15 to the base 17b side of the blade body 3, it is possible to avoid that the inlet openings 32A, 33A are formed in a place where thermal stress is likely to occur.

Further, as described above, generally, in the turbine rotor blade 1, temperature tends to be higher on the pressure side than on the suction side. For instance, in the embodiments shown in FIGS. 5, 6, and 8, since the inlet opening 32A of the pressure-side first cooling hole 32 is formed closer to the base 17b of the blade body 3 than the inlet opening 33A of the suction-side first cooling hole 33 is, on the pressure side where temperature tends to be higher than on the suction side, the inlet opening 32A of the pressure-side first cooling hole 32 can be positioned further away from the connection portion between the top panel 15 and the pressure-side blade wall 13 where thermal stress is likely to occur.

The same configuration may apply to the pressure-side second cooling hole 42 and the suction-side second cooling hole 43. For instance, in the embodiments shown in FIGS. 5, 6, and 8, the blade body 3 has the pressure-side second cooling hole 42 and the suction-side second cooling hole 43.

The pressure-side second cooling hole 42 and the suction-side second cooling hole 43 have the inlet openings 42A, 43A, respectively, each of which is formed at a position facing the serpentine passage 5 and away from the top panel 15 to the base 17b side of the blade body 3.

The inlet opening 42A of the pressure-side second cooling hole 42 is formed closer to the base 17b of the blade body 3 than the inlet opening 43A of the suction-side second cooling hole 43 is.

As described above, thermal stress is likely to occur at the connection portion between the top panel 15 and the pressure-side blade wall 13, and the connection portion between the top panel 15 and the suction-side blade wall 14. For instance, in the embodiments shown in FIGS. 5, 6, and 8, since the inlet openings 42A, 43A of the pressure-side second cooling hole 42 and the suction-side second cooling hole 43 are formed at positions facing the serpentine passage 5 and away from the top panel 15 to the base 17b side of the blade body 3, it is possible to avoid that the inlet openings 42A, 43A are formed in a place where thermal stress is likely to occur.

Further, as described above, generally, in the turbine rotor blade 1, temperature tends to be higher on the pressure side than on the suction side. For instance, in the embodiments shown in FIGS. 5, 6, and 8, since the inlet opening 42A of the pressure-side second cooling hole 42 is formed closer to the base 17b than the inlet opening 43A of the suction-side second cooling hole 43 is, on the pressure side where temperature tends to be higher than on the suction side, the inlet opening 42A of the pressure-side second cooling hole 42 can be positioned further away from the connection portion between the top panel 15 and the pressure-side blade wall 13 where thermal stress is likely to occur.

For instance, in the embodiments shown in FIGS. 4A and 7, the partition wall 10 is arranged such that the center line Wx of the partition wall 10 extending from one of the pressure-side blade wall 13 or the suction-side blade wall 14 to the other is inclined with respect to the camber line C. In other words, in the embodiments shown in FIGS. 4A and 7, the partition wall 10 is arranged such that the center line Wx of the partition wall 10 extending from one of the pressure-side blade wall 13 or the suction-side blade wall 14 to the other intersects a line segment perpendicular to the camber line C.

Thus, in the embodiments shown in FIGS. 4A and 7, since the center line Wx of the partition wall is inclined with respect to the camber line C which is the center line of the airfoil, the partition wall is connected obliquely with respect to the pressure-side blade wall 13 and the suction-side blade wall 14. Therefore, the pressure-side partition wall joint region 52 and the suction-side partition wall joint region 53 are enlarged. When the pressure-side partition wall joint region 52 and the suction-side partition wall joint region 53 are enlarged, it is difficult to cool the pressure-side partition wall joint region 52 and the suction-side partition wall joint region 53 by the cooling air flowing through the serpentine passage 5.

In this regard, for instance in the embodiments shown in FIGS. 4A and 7, since the blade body has at least one of the combination of the pressure-side first cooling hole 32 and the pressure-side second cooling hole 42 at least partially passing through the pressure-side partition wall joint region 52 or the combination of the suction-side first cooling hole 33 and the suction-side second cooling hole 43 at least partially passing through the suction-side partition wall joint region 53, even when the pressure-side partition wall joint region 52 and the suction-side partition wall joint region 53 are enlarged for the above-described reason, it is possible to suppress temperature rise of at least one of the pressure-side partition wall joint region 52 or the suction-side partition wall joint region 53.

The present invention is not limited to the embodiments described above, but includes modifications to the embodiments described above, and embodiments composed of combinations of those embodiments.

For instance, as described above, when the blade body 3 has at least one of the cooling holes 32, 33, 42, 43, it is possible to cool the partition wall joint region 51 through which at least a part of the at least one cooling hole passes.

When the blade body 3 has at least one of the cooling holes 32, 33, 42, 43, any of the cooling holes 32, 33, 42, 43 according to the embodiments described above may be adopted. Further, when the blade body 3 has at least two of the cooling holes 32, 33, 42, 43, cooling holes of different embodiments may be appropriately combined among the cooling holes 32, 33, 42, 43 according to the embodiments described above. Further, unless otherwise mentioned, the first cooling hole 31 includes the pressure-side first cooling hole 32 and the suction-side first cooling hole 33, and the second cooling hole 41 includes the pressure-side second cooling hole 42 and the suction-side second cooling hole 43. Further, unless otherwise mentioned, the inlet opening includes the pressure-side first inlet opening 32A, the pressure-side second inlet opening 42A, the suction-side first inlet opening 33A, and the suction-side second inlet opening 43A. Further, unless otherwise mentioned, the outlet opening includes the pressure-side first outlet opening 32B, the pressure-side second outlet opening 42B, the suction-side first outlet opening 33B, and the suction-side second outlet opening 43B.

REFERENCE SIGNS LIST

1 Turbine rotor blade
3 Airfoil portion (Blade body)
4, 4a, 4b, 4c, 4d, 4e, 4f Cooling passage
4U Upstream cooling passage (Leading-edge-side cooling passage)
4D Downstream cooling passage (Trailing-edge-side cooling passage)
5 Serpentine passage
6 Leading-edge-side serpentine passage
7 Trailing-edge-side serpentine passage
8 Trailing edge cooling passage
9a, 9b Supply passage
10 Partition wall
13 Pressure side wall portion (Pressure-side blade wall)
14 Suction-side wall portion (Suction-side blade wall)
13a, 14a Inner wall surface
13b, 14b, 15b Outer wall surface
15 Top panel
16 Connection portion
16a Inclined surface
17a Tip
17b Base
31 First cooling hole
31A First inlet opening
31B First outlet opening
32 Pressure-side first cooling hole
32A Pressure-side first inlet opening
32B Pressure-side first outlet opening
33 Suction-side first cooling hole
33A Suction-side first inlet opening
33B Suction-side first outlet opening
41 Second cooling hole
41A Second inlet opening
41B Second outlet opening
42 Pressure-side second cooling hole
42A Pressure-side second inlet opening
42B Pressure-side second outlet opening
43 Suction-side second cooling hole
43A Suction-side second inlet opening
43B Suction-side second outlet opening
AXa1, AXa2, AXb1, AXb2 Central axis
C Camber line
51 Partition wall joint region
52 Pressure-side partition wall joint region
53 Suction-side partition wall joint region
Wx Center line

The invention claimed is:

1. A turbine rotor blade, comprising a blade body including a pressure-side blade wall and a suction-side blade wall, wherein the blade body includes:
a serpentine passage composed of a cooling passage separated into a plurality of parts by a partition wall that connects the pressure-side blade wall and the suction-side blade wall and extends along a height direction of the blade body;
a first cooling hole communicating at a first end with the cooling passage via a first inlet opening formed in an inner wall surface of the pressure-side blade wall or an inner wall surface of the suction-side blade wall, and communicating at a second end with a first outlet opening formed in an outer wall surface of the pressure-side blade wall or an outer wall surface of the suction-side blade wall of the blade body, the first cooling hole extending in a leading edge direction from the first inlet opening to the first outlet opening; and
a second cooling hole communicating at a third end with a leading-edge-side cooling passage via a second inlet opening formed in the inner wall surface of the pressure-side blade wall or the inner wall surface of the suction-side blade wall, and communicating at a fourth end with a second outlet opening formed in the outer wall surface of the blade body, the second cooling hole extending in a trailing edge direction from the second inlet opening to the second outlet opening,
wherein the cooling passage includes a trailing-edge-side cooling passage communicating with the first cooling hole, and the leading-edge-side cooling passage communicating with the second cooling hole and disposed adjacent to a leading edge side of the trailing-edge-side cooling passage with the partition wall in between, and
wherein the cooling passage is configured such that cooling air flowing through the cooling passage flows into the trailing-edge-side cooling passage after flowing through the leading-edge-side cooling passage.

2. The turbine rotor blade according to claim 1, wherein the first cooling hole includes at least one of:
a pressure-side first cooling hole communicating at the first end with the cooling passage via a pressure-side first inlet opening formed in the inner wall surface of the pressure-side blade wall, and communicating at the second end with a pressure-side first outlet opening formed in the outer wall surface of the pressure-side blade wall of the blade body, the pressure-side first cooling hole extending in the leading edge direction from the pressure-side first inlet opening to the pressure-side first outlet opening; or
a suction-side first cooling hole communicating at the first end with the cooling passage via a suction-side first inlet opening formed in the inner wall surface of the suction-side blade wall, and communicating at the second end with a suction-side first outlet opening formed in the outer wall surface of the suction-side blade wall of the blade body, the suction-side first cooling hole extending in the leading edge direction from the suction-side first inlet opening to the suction-side first outlet opening.

3. The turbine rotor blade according to claim 2, wherein the first inlet opening is formed so as to face the cooling passage extending along the height direction of the blade body and closest to a trailing edge in the serpentine passage.

4. The turbine rotor blade according to claim 2, wherein the pressure-side first inlet opening is formed closer to a base of the blade body than the suction-side first inlet opening is to the base.

5. The turbine rotor blade according to claim 1, wherein the second cooling hole includes at least one of:
a pressure-side second cooling hole communicating at the third end with the leading-edge-side cooling passage via a pressure-side second inlet opening formed in the inner wall surface of the pressure-side blade wall, and communicating at the fourth end with a pressure-side second outlet opening formed in the outer wall surface of the pressure-side blade wall of the blade body, the pressure-side second cooling hole extending in the trailing edge direction from the pressure-side second inlet opening to the pressure-side second outlet opening; or a suction-side second cooling hole communicating at the third end with the leading-edge-side cooling passage via a suction-side second inlet opening formed in the inner wall surface of the suction-side blade wall, and communicating at the fourth end with a suction-side second outlet opening formed in the outer wall surface of the suction-side blade wall of the blade body, the suction-side second cooling hole extending in the trailing edge direction from the suction-side second inlet opening to the suction-side second outlet opening.

6. The turbine rotor blade according to claim 1, wherein a length in a leading-edge-to-trailing-edge direction between a position of the first outlet opening and a position of the second outlet opening is less than a length in the leading-edge-to-trailing-edge direction between a position of the first inlet opening and a position of the second inlet opening.

7. The turbine rotor blade according to claim 1, wherein a length in a leading-edge-to-trailing-edge direction between a position of the first outlet opening and a position of the second outlet opening is less than a thickness of the partition wall.

8. The turbine rotor blade according to claim 1, wherein each of the pressure-side blade wall and the suction-side blade wall includes a partition wall joint region joined to the partition wall, and wherein at least one of the first cooling hole or the second cooling hole passes through a part of the partition wall joint region.

9. The turbine rotor blade according to claim 8, wherein at least one of the first outlet opening or the second outlet opening is formed in the outer wall surface of the blade body so that a center position of the at least one of the first outlet opening or the second outlet opening is disposed in the partition wall joint region.

10. The turbine rotor blade according to claim 1, wherein the blade body includes a top panel formed on a tip side, and wherein at least one of the first outlet opening or the second outlet opening is formed in an outer wall surface of the top panel.

11. The turbine rotor blade according to claim 10, wherein the first inlet opening and the second inlet opening are formed at positions facing the serpentine passage and away from the top panel to a base side of the blade body.

12. The turbine rotor blade according to claim 1, wherein the blade body includes a top panel formed on a tip side, wherein a connection portion between the pressure-side blade wall and the top panel has an inclined surface inclined with respect to the pressure-side blade wall and the top panel at the outer wall surface of the blade body, and wherein at least one of the first outlet opening or the second outlet opening is formed in the inclined surface.

13. The turbine rotor blade according to claim 1, wherein a center line of the partition wall extending from one of the pressure-side blade wall or the suction-side blade wall to the other is inclined with respect to a camber line.

14. A gas turbine, comprising the turbine rotor blade according to claim 1.

* * * * *